United States Patent [19]
Koga et al.

[11] Patent Number: 5,657,625
[45] Date of Patent: Aug. 19, 1997

[54] APPARATUS AND METHOD FOR INTERNAL COMBUSTION ENGINE CONTROL

[75] Inventors: Kazuo Koga, Okazaki; Kojiro Okada, Nagoya; Yoshiaki Danno, Kyoto; Kazuhide Togai, Takatsuki; Osamu Hirako; Shogo Ohmori, both of Okazaki; Daisuke Sanbayashi, Toyota; Yoshiaki Kodama, Okazaki, all of Japan

[73] Assignee: Mitsubishi Jidosha Kogyo Kabushiki Kaisha, Tokyo, Japan

[21] Appl. No.: 490,077

[22] Filed: Jun. 13, 1995

[30] Foreign Application Priority Data

| Jun. 17, 1994 | [JP] | Japan | 6-135467 |
| Sep. 7, 1994 | [JP] | Japan | 6-214059 |
| Oct. 4, 1994 | [JP] | Japan | 6-240344 |
| Oct. 5, 1994 | [JP] | Japan | 6-241087 |

[51] Int. Cl.$^6$ ........................................ F01N 3/00
[52] U.S. Cl. ........................ 60/274; 60/285; 60/297
[58] Field of Search ...................... 60/274, 285, 247, 60/286, 300

[56] References Cited

U.S. PATENT DOCUMENTS

| 5,492,094 | 2/1996 | Cullen et al. | 60/285 |
| 5,499,500 | 3/1996 | Hamburg et al. | 60/274 |
| 5,528,899 | 6/1996 | Ono | 60/285 |
| 5,537,816 | 7/1996 | Ridgway et al. | 60/274 |
| 5,553,451 | 9/1996 | Harada | 60/300 |
| 5,557,933 | 9/1996 | Numata et al. | 60/274 |

Primary Examiner—Joan T. Kwon

[57] ABSTRACT

An apparatus for controlling an internal combustion engine having an exhaust purifying catalytic device which absorbs nitrogen oxides contained in exhaust when the engine is in a lean-combustion mode and which deoxidizes the absorbed nitrogen oxides when the engine is in a rich-combustion mode. The engine control apparatus includes an electronic control unit for estimating the amount of purifying capability reducing substances other than nitrogen oxides, which decreases the nitrogen oxide adsorbing ability of the catalytic device, absorbed by the catalytic device, on the basis of the accumulated value of vehicle travel distance, fuel consumption of engine, or intake air amount. The control unit changes the operating condition of engine so that the exhaust gas temperature is increased when it is judged that the estimated adsorption amount has reached a predetermined adsorption amount. The exhaust purifying catalytic device is heated by high-temperature exhaust gas to remove the purifying capability reducing substances from the catalytic device.

77 Claims, 18 Drawing Sheets

APPARATUS AND METHOD FOR INTERNAL COMBUSTION ENGINE CONTROL

BACKGROUND OF THE INVENTION

1. Field of the invention

The present invention relates to an apparatus and method for internal combustion engine control capable of preventing the decrease in purifying function of an exhaust purifying catalytic device.

2. Description of the Related Art

There is known a method for improving the fuel economy or other performance of an internal combustion engine by controlling the air-fuel ratio to a target value (for example, 22) leaner than the theoretical air-fuel ratio (14.7) to thereby carry out lean-combustion in the engine when the engine is driven in a predetermined driving state. However, if a three-way catalytic converter is used for the engine to which the aforesaid method is applied, nitrogen oxides (NOx) cannot be sufficiently purified during the lean-combustion since the three-way catalytic converter does not operate at its full potential in the lean air-fuel ratio range. In this respect, attempts have been made to reduce the emission of NOx even in the lean-combustion operation by using a so-called NOx catalyst, which adsorbs NOx discharged from the engine in an oxygen enriched state (oxidizing atmosphere) and deoxidizes the adsorbed NOx in a hydrocarbon (HC) excessive state (reducing atmosphere).

However, there is a limit to the amount of NOx which can be adsorbed by the NOx catalyst. If the engine is continuously driven in a lean-combustion mode, the catalyst will be saturated with NOx. In this case, most part of NOx gas discharged from the engine is emitted to the atmosphere. To obviate this, before or when the NOx catalyst is saturated with adsorbed NOx, a shift is made to the rich mixture control, which controls the air-fuel ratio to a theoretical ratio or its near values to thereby start the theoretical ratio operation or rich-combustion operation of the engine. The resultant exhaust gas containing plenty of unburnt gases creates a reducing atmosphere for deoxidization of NOx around the catalyst.

Regarding the timing at which the lean-combustion operation is switched to the theoretical ratio operation or rich-combustion operation, a method is known from Japanese Patent Application KOKAI Publication No. H5-133260 in which the elapsed time from the start of lean air-fuel ratio control is measured, and the changeover to rich air-fuel control is forcedly carried out when a predetermined time has elapsed. With this method, the lean air-fuel ratio control is started again upon completion of deoxidization of NOx adsorbed by the catalyst during the rich air-fuel ratio control. In this way, the lean-combustion and rich-combustion are alternately effected to reduce the emission of NOx.

According to the aforementioned related art, the purifying ability of NOx catalyst can be restored by deoxidizing and removing NOx adsorbed by the NOx catalyst. However, to the NOx catalyst adheres a substance which reduces the NOx adsorbing capability of the catalyst by adhering to a place where NOx is naturally adsorbed (hereinafter called a purifying capability reducing substance) such as sulfur and the compounds thereof.

The purifying capability reducing substances other than NOx cannot be removed even if the air-fuel ratio control as disclosed in Japanese Patent Application KOKAI Publication No. H5-133260 is effected, and the amount of adherence increases as the engine driving time elapses. If the adherence of purifying capability reducing substances is left as it is, the NOx adsorbing ability of the NOx catalyst is decreased, by which the purifying function thereof cannot be fulfilled sufficiently.

Japanese Patent Application KOKAI Publication No. H6-66129 discloses a technique in which an exhaust purifying catalytic device is heated by using an electric heater when it is judged that the amount of sulfur oxides adsorbed by the exhaust purifying catalytic device has reached a predetermined amount, by which the sulfur oxides adsorbed by the catalytic device is removed from the catalytic device. In this related art, however, an electric heater for heating the exhaust purifying catalytic device must be newly installed, and in addition electric energy must be supplied to the electric heater. The capacity of the battery mounted on a vehicle which is driven by an internal combustion engine is limited, and a battery of a high capacity must be used to heat the exhaust purifying catalytic device by using an electric heater.

Japanese Patent Application KOKAI Publication No. H5-76771 discloses a technique in which sulfur oxides adsorbed by an exhaust purifying catalytic device of a type which directly decomposes nitrogen oxides are oxidized or deoxidized when the engine is hot, by which sulfur oxides are removed from the catalytic device. In this related art, however, even if the adsorption of sulfur oxides becomes excessive, the sulfur oxides cannot be removed from the catalytic device when the engine temperature is low.

SUMMARY OF THE INVENTION

An object of the present invention is to provide an apparatus and method for internal combustion engine control capable of restoring the purifying function of an exhaust purifying catalytic device while the internal combustion engine is being operated even if purifying capability reducing substances other than nitrogen oxides adhere to the exhaust purifying catalytic device.

According to one aspect of the present invention, there is provided a control apparatus for an internal combustion engine having an exhaust purifying catalytic device disposed in an exhaust passage of the engine for reducing the emission of nitrogen oxides to atmosphere, the catalytic device being operable to adsorb nitrogen oxides, contained in exhaust gas discharged from the engine, when the engine is in a lean-combustion mode where the air-fuel ratio of an air-fuel mixture supplied to the engine is leaner than the theoretical air-fuel ratio, and to deoxidize the adsorbed nitrogen oxides when the engine is in a rich-combustion mode where the air-fuel ratio is equal to or richer than the theoretical air-fuel ratio.

This engine control apparatus comprises adsorption amount estimating means for estimating the adsorption amount of purifying capability reducing substances, which decreases the nitrogen oxide adsorbing ability of the exhaust purifying catalytic device, adsorbed by the exhaust purifying catalytic device and for determining whether the estimated adsorption amount has reached a predetermined adsorption amount; and catalyst heating means for removing the purifying capability reducing substances from the exhaust purifying catalytic device by increasing the temperature of the exhaust purifying catalytic device by changing the operating condition of internal combustion engine so that the exhaust gas temperature increases when the adsorption amount estimating means judges that the estimated adsorption amount has reached the predetermined adsorption amount.

According to this engine control apparatus, the purifying capability reducing substances other than nitrogen oxides adhering to the exhaust purifying catalytic device can be removed while the engine is being operated to restore the purifying function of the exhaust purifying catalytic device.

Preferably, the adsorption amount estimating means includes fuel amount accumulating means for accumulating the fuel consumption of internal combustion engine, and judges that the estimated adsorption amount has reached the predetermined adsorption amount when the accumulated fuel consumption calculated by the fuel amount accumulating means reaches a predetermined amount. According to this preferred embodiment, the amount of adhering purifying capability reducing substances can easily be determined from the accumulated value of fuel consumption without direct measurement.

Preferably, the internal combustion engine is supplied with fuel from a fuel injection valve driven by the pulse-shaped driving current, the fuel amount accumulating means accumulates the pulse width of the driving current, and the accumulated fuel consumption is calculated on the basis of the accumulated pulse width. According to this preferred embodiment, the amount of adhering purifying capability reducing substances can easily be determined from the accumulated value of driving pulse width of fuel injection valve.

Preferably, the fuel amount accumulating means accumulates the fuel consumption only when the internal combustion engine is being operated in a lean-combustion mode. In this case, the fuel amount accumulating means accumulates the fuel consumption only in the lean-combustion operation, in which the purifying capability reducing substances adheres easily and the catalyst deteriorates heavily, so that the amount of adhering purifying capability reducing substances can be estimated more accurately.

Preferably, the engine control apparatus further includes catalyst temperature detecting means for detecting the temperature of the exhaust purifying catalytic device, and the fuel amount accumulating means accumulates the fuel consumption only when the catalytic device temperature is not higher than a predetermined temperature. In this case, the amount of adhering purifying capability reducing substances can be estimated more accurately.

Preferably, the adsorption amount estimating means includes travel distance accumulating means for accumulating the travel distance of the vehicle on which the internal combustion engine is mounted, and judges that the estimated adsorption amount has reached the predetermined adsorption amount when the accumulated vehicle travel distance reaches a predetermined value. According to this preferred embodiment, the amount of adhering purifying capability reducing substances can easily be determined from the accumulated value of vehicle travel distance without direct measurement.

Preferably, the adsorption amount estimating means includes intake air amount accumulating means for detecting and accumulating the intake air amount of internal combustion engine, and judges that the estimated adsorption amount has reached the predetermined adsorption amount when the accumulated intake air amount reaches a predetermined value. In this case, the amount of adhering purifying capability reducing substances can easily be determined from the accumulated value of intake air amount without direct measurement.

Preferably, the catalyst heating means burns fuel near the exhaust purifying catalytic device by changing the operating condition of internal combustion engine so that fuel and air are supplied into the exhaust gas, by which the exhaust purifying catalytic device is heated by increasing the exhaust gas temperature. According to this preferred embodiment, the purifying capability reducing substances can be removed satisfactorily to restore the nitrogen oxide adsorbing ability of the exhaust purifying catalyst.

Preferably, the catalyst heating means includes air-fuel ratio control means for controlling the air-fuel ratio of a mixture supplied into the internal combustion engine, and the air-fuel ratio control means controls the air-fuel ratio in part of cylinders of the internal combustion engine to a value lower than the theoretical air-fuel ratio to perform rich-combustion operation in the part of the cylinders and controls the air-fuel ratio in the remaining cylinders to a value higher than the theoretical air-fuel ratio to perform lean-combustion operation in the remaining cylinders, by which the fuel and air are supplied into the exhaust gas. In this case, hydrocarbon and oxygen can easily be supplied to the exhaust purifying catalyst and the purifying capability reducing substances can be removed satisfactorily without separately installing a device for supplying fuel and air on the outside of the exhaust purifying catalyst.

Preferably, the air-fuel ratio control means makes the average air-fuel ratio of all cylinders of internal combustion engine substantially equal to the theoretical air-fuel ratio when the exhaust purifying catalytic device is heated. In this case, the temperature of the exhaust purifying catalytic device can be raised without increasing contaminants in exhaust gas.

Preferably, the air-fuel ratio control means includes catalyst temperature detecting means for detecting the temperature of the exhaust purifying catalytic device, and controls the air-fuel ratio so that the catalytic device temperature is kept at a predetermined temperature after the detected catalytic device temperature has increased to the predetermined temperature. In this case, the minimum air-fuel ratio correction necessary for keeping the catalytic device temperature may be made, so that the deterioration in engine operating condition caused by the air-fuel ratio control can be prevented.

Preferably, the air-fuel ratio control means makes the average air-fuel ratio of all cylinders of internal combustion engine substantially equal to the theoretical air-fuel ratio before the detected catalytic device temperature reaches the predetermined temperature, and corrects the average air-fuel ratio to the side richer than the theoretical air-fuel ratio after the predetermined temperature has been reached. In this case, carbon monoxide and hydrocarbon contained in large amounts in the exhaust gas react with the purifying capability reducing substances, so that the purifying capability reducing substances are removed satisfactorily. Nitrogen oxides can also be deoxidized by hydrocarbon and removed.

Preferably, the internal combustion engine is a V-type engine, and the part of the cylinders are on one bank side of the V-type engine, and the remaining cylinders are on the other bank. In this case, the engine operates in rich-combustion and lean-combustion modes in a well-balanced manner, so that the output of engine can be stabilized.

Preferably, the air-fuel ratio control means includes ignition timing control means for controlling the ignition timing of internal combustion engine, and the ignition timing control means retards the ignition timing of the part of the cylinders in which the rich-combustion operation is performed and advances the ignition timing of the remaining cylinders in which the lean-combustion operation is performed. In this case, both of the ignition timing in the cylinders in which rich-combustion operation is performed and the ignition timing in the cylinders in which lean-combustion operation is performed can be controlled properly, so that the decrease in engine output caused by the air-fuel ratio control can be prevented.

Preferably, the air-fuel ratio control means includes intake air amount regulating means, and the intake air amount regulating means increases the intake air amount of internal combustion engine when the rich-combustion operation is performed in the part of the cylinders of the internal combustion engine and the lean-combustion operation is performed in the remaining cylinders. In this case, the decrease in engine output caused by the air-fuel ratio control can be prevented.

Preferably, the engine control apparatus includes a lockup clutch interposed between the internal combustion engine and an automatic transmission and clutch control means for changing over the lockup clutch between a connected state in which the engine is connected directly to the automatic transmission and a disconnected state in which the engine is not connected directly to the automatic transmission, and the clutch control means makes the lockup clutch disconnected during the time when the temperature of the exhaust purifying catalytic device is raised by the catalyst heating means. In this case, the lockup clutch of the automatic transmission can be disconnected at the time of air-fuel control, so that the variation in engine output is not transmitted to the driving wheel of the vehicle, by which the deterioration in driving feeling can be prevented.

Preferably, the engine control apparatus further includes an operating condition detecting means for detecting the operating condition of internal combustion engine, and the catalyst heating means heats the exhaust purifying catalytic device when the operating condition detecting means judges that the internal combustion engine is in a predetermined medium or heavy load operating condition. According to this preferred embodiment, when the operating condition of engine is unstable, the deterioration in engine operating condition can be prevented by inhibiting the supply of fuel and air to the exhaust purifying catalytic device.

Preferably, the operating condition detecting means includes exhaust temperature estimating means for estimating an exhaust temperature of internal combustion engine, and the operating condition detecting means judges that the internal combustion engine is in the predetermined medium or heavy load operating condition when the estimated exhaust temperature is not lower than a predetermined temperature. In this case, when the exhaust temperature is low, the deterioration in engine operating condition can be prevented by inhibiting the supply of fuel and air to the exhaust purifying catalyst.

Preferably, the exhaust temperature estimating means includes load detecting means for detecting the load of internal combustion engine and rotational speed detecting means for detecting the rotational speed of internal combustion engine, and the exhaust temperature estimating means estimates the exhaust temperature on the basis of the detected engine load and the detected engine rotational speed. In this case, it can be properly determined that the engine is not in the middle or heavy load operating condition, and unnecessary supply of fuel and air to the exhaust purifying catalyst device can be prevented, to thereby prevent the deterioration in operating condition.

Preferably, the engine control apparatus includes time measuring means for accumulatively measuring a time period elapsed during the time when the operating condition detecting means judges that the internal combustion engine is in the predetermined medium or heavy load operating condition, and the catalyst heating means heats the exhaust purifying catalytic device until the measured elapsed time period reaches a predetermined time. According to this preferred embodiment, the exhaust purifying catalytic device can sufficiently be kept in the high-temperature state, so that the purifying capability reducing substances can be removed substantially perfectly.

Preferably, the engine control apparatus includes catalyst temperature detecting means for detecting the temperature of the exhaust purifying catalytic device, and the time measuring means accumulatively measures the elapsed time period when the detected catalyst device temperature is not lower than a predetermined temperature. In this case, the measurement of elapsed time period can be inhibited during the time when the temperature of the exhaust purifying catalytic device is not increased sufficiently, so that the purifying capability reducing substances can be removed reliably.

Preferably, the time measuring means starts to accumulatively measure the elapsed time period from the moment when a predetermined delay time has elapsed after the operating condition detecting means judges that the internal combustion engine is in the predetermined medium or heavy load operating condition. In this case, the measurement of elapsed time period can be inhibited during the time when the temperature is unstable as just after the start of temperature rise of the exhaust purifying catalyst, so that the purifying capability reducing substances can be removed reliably.

Preferably, the adsorption amount estimating means includes storage means for storing the estimated adsorption amount of the purifying capability reducing substances as long as the storage means is connected to a power source and power is supplied from the power source, and the catalyst heating means heats the exhaust purifying catalytic device independently of the estimated adsorption amount when the supply of power from the power source to the storage means is restarted after power is not supplied from the power source to the storage means. In this case, the decrease in purifying ability of the exhaust purifying catalytic device can be prevented even when there is a possibility that the estimated adherence amount of purifying capability reducing substances does not accurately represent the actual adherence amount.

Preferably, the catalyst heating means increases the exhaust gas temperature by changing the burning state of internal combustion engine. In this case, the purifying capability reducing substances can be removed from the exhaust purifying catalytic device without using a special catalyst heating means such as an electric heater.

Preferably, the heating means includes ignition timing correcting means for correcting the ignition timing of internal combustion engine, and the ignition timing correcting means changes the burning state of internal combustion engine by retarding the ignition timing of internal combustion engine. In this case, the retarding of the ignition timing increases the exhaust gas temperature, so that the temperature oft the exhaust purifying catalytic device can be raised.

Preferably, the catalyst heating means includes intake air amount correcting means for correcting the intake air amount of internal combustion engine, and the intake air amount correcting means increases the intake air amount during the time when the ignition timing correcting means retards the ignition timing. In this case, the decrease in engine output caused by the retarding of the ignition timing can be prevented.

Preferably, the engine control apparatus includes rotational speed detecting means for detecting the rotational speed of internal combustion engine and volumetric efficiency detecting means for detecting the volumetric efficiency of internal combustion engine, and the ignition timing correcting means sets the retard amount of ignition timing on the basis of the detected engine rotational speed and the detected volumetric efficiency. In this case, the retard amount of ignition timing can be set properly, and the deterioration in engine operating condition caused by retarded ignition timing can be prevented.

Preferably, the catalyst heating means includes catalyst temperature detecting means for detecting the temperature of the exhaust purifying catalytic device and air-fuel ratio control means for controlling the internal combustion engine so that the engine is operated in the rich-combustion operation mode when the detected catalytic device temperature reaches a predetermined temperature. According to this preferred embodiment, the execution of rich-combustion operation allows unburned hydrocarbon to be contained in large amounts in the exhaust gas, so that the unburnt hydrocarbon reacts with the purifying capability reducing substances at a high temperature, by which the purifying capability reducing substances can satisfactorily be removed from the exhaust purifying catalyst.

Preferably, the catalyst heating means includes air-fuel control means for controlling the internal combustion engine so that the engine is operated in the rich-combustion mode when the adsorption amount estimating means judges that the adsorption amount of the purifying capability reducing substances has reached the predetermined adsorption amount; and secondary air supplying means for supplying secondary air to the upstream side with respect to the exhaust purifying catalytic device in the exhaust passage when the internal combustion engine is controlled so that the engine is operated in the rich-combustion mode. In this case, unburnt hydrocarbon is contained in large amounts in the exhaust gas, and the unburnt hydrocarbon is burnt in the exhaust passage in the presence of oxygen in secondary air, by which the temperature of the exhaust purifying catalytic device can be increased.

Preferably, the catalyst heating means includes catalyst temperature detecting means for detecting the temperature of the exhaust purifying catalytic device, and the secondary air supplying means decreases the supply amount of secondary air when the detected catalytic device temperature reaches a predetermined temperature. In this case, only the combustion necessary for keeping the catalyst temperature can be executed after the catalyst temperature has reached the predetermined temperature, and the remaining unburnt hydrocarbon is allowed to react with the purifying capability reducing substances at a high temperature to remove the purifying capability reducing substances.

Preferably, the engine control apparatus includes rotational speed detecting means for detecting the rotational speed of internal combustion engine and volumetric efficiency detecting means for detecting the volumetric efficiency of internal combustion engine, and the air-fuel ratio control means sets the air-fuel ratio during the rich-combustion operation of internal combustion engine on the basis of the detected engine rotational speed and the detected volumetric efficiency. In this case, the air-fuel ratio in rich-combustion operation can be set properly, so that the deterioration in engine operating condition can be prevented.

Preferably, the engine control apparatus includes rotational speed detecting means for detecting the rotational speed of internal combustion engine and volumetric efficiency detecting means for detecting the volumetric efficiency of internal combustion engine, and the secondary air supplying means sets the supply amount of secondary air on the basis of the detected engine rotational speed and the detected volumetric efficiency. In this case, the supply amount of secondary air can be set properly, so that secondary air containing oxygen of an amount suitable for the amount of unburnt hydrocarbon can be supplied to the exhaust passage.

Preferably, the catalyst heating means increases the exhaust gas temperature by changing the flow velocity of exhaust gas. In this case as well, the purifying capability reducing substances can satisfactorily be burnt and removed from the exhaust purifying catalyst.

Preferably, the catalyst heating means includes an exhaust throttle valve for changing the exhaust passage area, which is installed on the downstream side with respect to the exhaust purifying catalytic device in the exhaust passage, and the catalyst heating means changes the flow velocity of exhaust gas by controlling the exhaust throttle valve so that the exhaust passage area is decreased. According to this preferred embodiment, the decrease in passage area decreases the flow velocity of exhaust gas to retain the exhaust gas in the exhaust purifying catalytic device, by which the temperature of the exhaust purifying catalytic device can be increased by the heat of exhaust gas.

Preferably, the catalyst heating means includes catalyst temperature detecting means for detecting the temperature of the exhaust purifying catalytic device and fuel supplying means for supplying fuel to the upstream side with respect to the exhaust purifying catalytic device in the exhaust passage when the detected catalyst temperature reaches a predetermined temperature. In this case, hydrocarbon is supplied to the exhaust purifying catalytic device to allow this hydrocarbon to react with the purifying capability reducing substances, by which the purifying capability reducing substances can be removed.

Preferably, the engine control apparatus further includes exhaust pipe length changing means for changing the exhaust passage length from the exhaust port of internal combustion engine to the exhaust purifying catalytic device so that the exhaust pipe length changing means is controlled in such a manner that, when the adsorption amount estimating means judges that the adsorption amount of the purifying capability reducing substances has reached the predetermined adsorption amount, the exhaust passage length is shorter than the length before it is judged that the estimated adsorption amount has reached the predetermined adsorption amount, by which the temperature of exhaust gas supplied to the exhaust purifying catalytic device is increased. According to this preferred embodiment, exhaust gas of a higher temperature is supplied to the exhaust purifying catalytic device to increase the temperature of the catalytic device, by which the purifying capability reducing substances are burnt and removed.

Preferably, the exhaust purifying catalytic device is disposed near the body of internal combustion engine. In this case, the heat dissipated from the body of internal combustion engine can be utilized effectively to assist the temperature rise of the exhaust purifying catalyst.

Preferably, the catalyst heating means includes catalyst temperature detecting means for detecting the temperature of the exhaust purifying catalytic device and fuel supplying means for supplying fuel to the upstream side with respect to the exhaust purifying catalytic device in the exhaust passage when the detected catalyst temperature reaches a predetermined temperature. According to this preferred embodiment, hydrocarbon is supplied to the exhaust purifying catalytic device to allow this hydrocarbon to react with the purifying capability reducing substances at a high temperature, by which the purifying capability reducing substances can be removed reliably without re-adherence of the purifying capability reducing substances to the exhaust purifying catalytic device.

According to another aspect of the present invention, the engine control apparatus comprises a burner for heating the exhaust purifying catalytic device, which is disposed near the exhaust purifying catalytic device; adsorption amount estimating means for estimating the adsorption amount of purifying capability reducing substances, which decreases the nitrogen oxide adsorbing ability of the exhaust purifying catalytic device, adsorbed by the exhaust purifying catalytic device, and for determining whether the estimated adsorption amount has reached a predetermined adsorption amount; and catalyst heating means for removing the purifying capability reducing substances from the exhaust purifying catalytic device by activating the burner when the adsorption amount estimating means judges that the adsorption amount of the purifying capability reducing substances has reached the predetermined adsorption amount. According to this control apparatus, the exhaust purifying catalytic device is heated directly by the flame of the burner to increase the catalyst temperature reliably and rapidly, by which the purifying capability reducing substances can be removed.

According to still another aspect of the present invention, there is provided an internal combustion engine control method for reducing emission of nitrogen oxides to atmosphere, by causing nitrogen oxides, contained in exhaust gas discharged from the internal combustion engine, to be adsorbed by an exhaust purifying catalytic device, disposed in an exhaust passage of the internal combustion engine, when the engine is in a lean-combustion mode where an air-fuel ratio of an air-fuel mixture supplied to the engine is leaner than a theoretical air-fuel ratio, and by deoxidizing adsorbed nitrogen oxides by means of the exhaust purifying catalytic device when the internal combustion engine is in a rich-combustion mode where the air-fuel ratio is equal to or richer than the theoretical air-fuel ratio.

This engine control method comprises the steps of (a) estimating the adsorption amount of purifying capability reducing substances, which decreases the nitrogen oxide adsorbing ability of the exhaust purifying catalytic device, adsorbed by the exhaust purifying catalytic device, and determining whether the estimated adsorption amount has reached a predetermined adsorption amount; and (b) removing the purifying capability reducing substances from the exhaust purifying catalytic device by increasing the temperature of the exhaust purifying catalytic device by changing the operating condition of internal combustion engine so that the exhaust gas temperature increases when it is judged in step (a) that the estimated adsorption amount has reached the predetermined adsorption amount.

According to this engine control method, the purifying capability reducing substances adhering to the exhaust purifying catalytic device is removed while the engine is being operated, by which the purifying function of the exhaust purifying catalytic device can be restored.

Like the above-described engine control apparatus, this engine control method has various preferred embodiments which achieve the same effects as those of the preferred embodiments of the above-described engine control apparatus.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENT

An engine control apparatus in accordance with a first embodiment of the present invention will be described.

Figure 1:
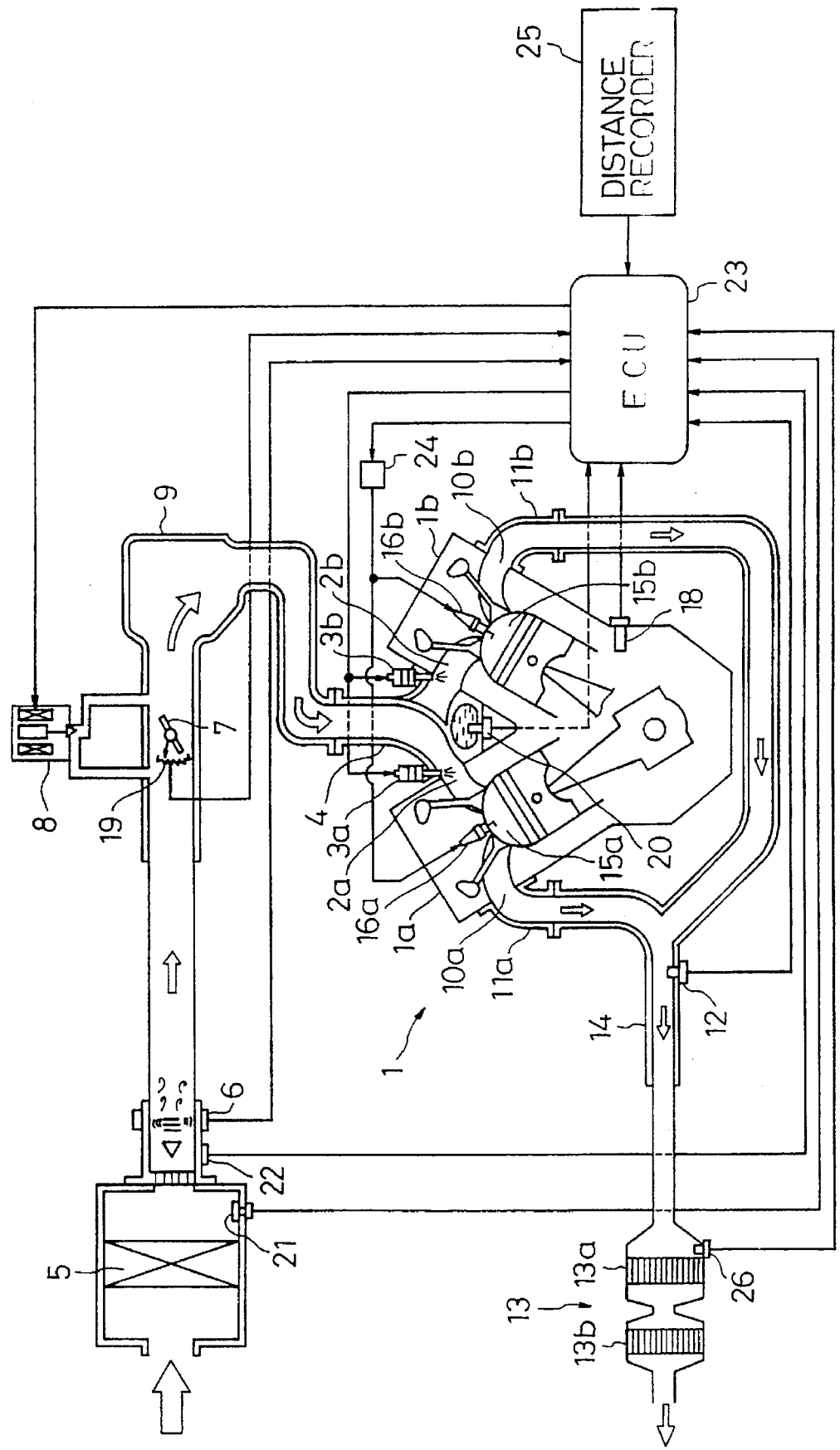
FIG. 1 is a schematic view showing an engine control apparatus according to a first embodiment of the present invention, showing together with an engine controlled by the control apparatus.
Figure 3:
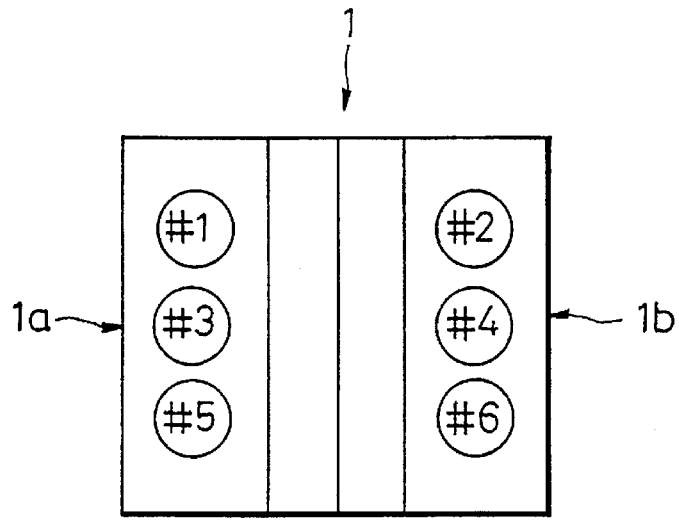
FIG. 3 is a schematic view showing a cylinder arrangement of a six-cylinder V-type engine shown in FIG. 1.
Figure 4:
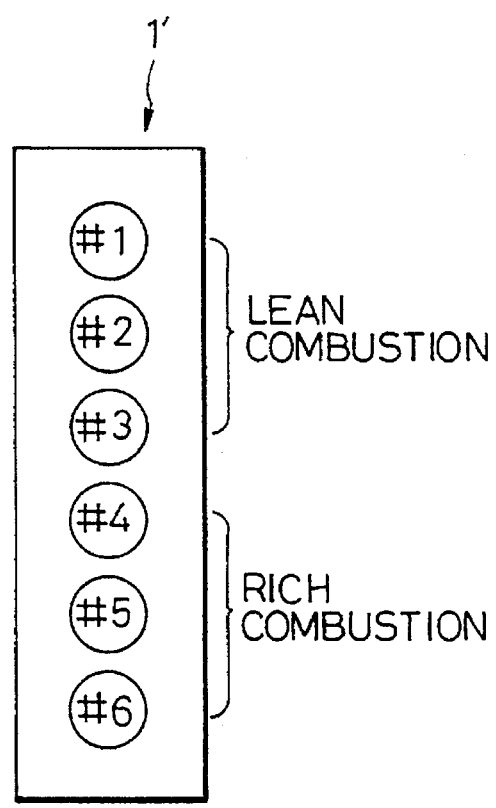
FIG. 4 is a schematic view showing a cylinder arrangement of six-cylinder in-line engine to which an engine control apparatus in accordance with a modification of the first embodiment is applied.

In FIG. 1, reference numeral 1 denotes the body of an automotive engine (hereinafter called an engine) driven under the control of an engine control apparatus which will be described later. The engine, which is a six-cylinder V-type gasoline engine (FIG. 3), for example, having a first bank and a second bank 1a and 1b each consisting of three cylinders, includes combustion chambers, an intake system, an ignition system and the like designed to cope with lean-combustion driving.

The engine 1 has intake ports 2a and 2b for respective cylinders, which are connected to an intake manifold 4 in which fuel injection valves 3a and 3b for respective cylinders are provided. An intake pipe 9 connected to the intake manifold 4 is provided with an air cleaner 5, a throttle valve 7, and the like. An idling engine speed control (ISC) valve 8 is provided in a bypass passage which bypasses the throttle valve 7 to stabilize the idling operation of the engine 1.

Exhaust manifolds 11a and 11b are connected to exhaust ports 10a and 10b of the engine 1, respectively. Further, a muffler (not shown) is connected to the exhaust manifolds 11a and 11b via an exhaust pipe 14 and exhaust purifying catalytic device 13.

The exhaust purifying catalytic device 13 has an NOx catalyst 13a and a three-way catalytic converter 13b disposed on the downstream side of the NOx catalyst 13a. The NOx catalyst 13a contains, as catalytic substance, Pt (platinum) and alkali rare earth metal such as lanthanum and cerium, for instance, and has a function of adsorbing NOx in the oxidizing atmosphere and deoxidizing NOx into $N_2$ (nitrogen) and the like in the reducing atmosphere which contains HC. The three-way catalytic converter 13b has a function of oxidizing HC and CO (carbon monoxide) and deoxidizing NOx. The NOx deoxidizing ability becomes the maximum in or near the theoretical (stoichiometric) air-fuel ratio.

The engine 1 is further provided with ignition plugs 16a and 16b for igniting a mixture of air and fuel supplied from the intake ports 2a and 2b to the combustion chambers 15a and 15b.

The engine control apparatus has an electronic control unit (ECU) 23 as a main constituent. The ECU 23 has an input/output device, memory devices (ROM, RAM, non-volatile RAM, etc.) incorporating various control programs, a central processing unit (CPU), a timer counter serving as time measuring means, and the like (none of which is shown in the drawing). Various sensors shown in FIG. 1 are connected to the input side of the ECU 23.

In FIG. 1, reference numeral 6 denotes an air flow sensor, mounted on the intake pipe 9, for detecting the intake air amount $A_f$. A Karman vortices air flow sensor or the like is adequately used as the air flow sensor 6. Further, reference numeral 12 denotes an air-fuel ratio sensor (linear air-fuel ratio sensor etc.), mounted on the exhaust pipe 14, for detecting the air-fuel ratio; 18 denotes a crank angle sensor having an encoder interlocked with the camshaft of the engine 1 and generating a crank angle synchronization signal $\theta_{CR}$; and 19 denotes a throttle sensor for detecting the opening $\theta_{TH}$ of the throttle valve 7. Further, reference numeral 20 denotes a water temperature sensor for sensing the engine coolant temperature $T_W$; 21 denotes an atmospheric pressure sensor for sensing the atmospheric pressure $P_a$; and 22 denotes an intake air temperature sensor for sensing the intake air temperature $T_a$. Reference numeral 25 denotes a distance recorder provided on a vehicle on which the engine 1 is mounted. The distance recorder 25 detects the travel distance of vehicle on the basis of the vehicle speed pulse sent from a wheel speed sensor or the like (not shown). Reference numeral 26 denotes a catalyst temperature sensor (catalyst temperature detecting means) capable of sensing the NOx catalyst temperature up to a high temperature region, mounted just on the upstream side of the NOx catalyst 13a.

The engine rotational speed $N_e$ is calculated by the ECU 23 according to the time interval between crank angle synchronization signals $\theta_{CR}$ supplied from the crank angle sensor 18. The engine load $L_e$ is calculated according to, e.g., the engine rotational speed $N_e$ or the throttle opening $\theta_{TH}$ detected by the throttle sensor 19. The volumetric efficiency $\eta_v$ is calculated by the ECU 23 on the basis of the air flow rate $A_f$ detected by the air flow sensor 6 and the engine rotational speed $N_e$. Thus, the ECU 23 functions as engine rotational speed detecting means, engine load detecting means, and volumetric efficiency detecting means in cooperation with the sensors 6, 18, and 19. The ECU 23 also functions, in cooperation with the catalyst temperature sensor 26, as exhaust temperature estimating means for estimating the temperature of exhaust gas from the engine 1.

The ECU 23 calculates the optimum values of the fuel injection amount, ignition timing and the like based on pieces of information detected by various sensors. The ECU 23 drives the fuel injection valves 3a and 3b and an ignition unit 24, connected to the output side of the ECU 23, in accordance with the results of the calculation. The fuel injection valves 3a and 3b are provided so as to be opened during the time when a pulse-shaped current signal is supplied from the ECU 23 and so that the fuel injection amount changes in accordance with the pulse width of the current signal. The ignition unit 24 outputs a high voltage to an ignition plug 16 of respective cylinders in accordance with the command from the ECU 23. The ECU 23 regulates the opening of the ISC valve 8 in accordance with the change in the engine load $L_e$ caused by the operation of an air conditioner or the like (not shown) during the idling operation, and optimizes the amount of intake air to the engine 1, thereby preventing the variation in idling rotational speed caused by the change in engine load $L_e$.

The engine control apparatus has a function of preventing the decrease in purifying ability of the NOx catalyst 13a, which is caused by the adherence of purifying capability reducing substances (for example, sulfur or the compounds thereof) other than NOx to the catalyst 13a. Specifically, when the amount of purifying capability reducing substances adhering to the NOx catalyst 13a reaches a predetermined value, a refresh operation is performed in which the NOx catalyst 13a is heated to a high temperature, by which the purifying capability reducing substances, which hiders the adsorption of NOx into the catalyst 13a, are burnt and removed. Thereby, the NOx adsorbing ability of the catalyst 13a is restored.

In the refresh operation of this embodiment, the amount of adhering purifying capability reducing substances is estimated on the basis of the vehicle travel distance. Also, lean-combustion is effected in some cylinders (more generally, part of or at least one of the cylinders) of the engine 1, and rich-combustion is effected in the remaining cylinders, by which the air discharged from some cylinders and the unburnt hydrocarbon discharged from the remaining cylinders are supplied to the NOx catalyst 13a to heat the NOx catalyst 13a.

In connection to the refresh operation, the ECU 23, in cooperation with the distance recorder 25, functions as adsorption amount estimating means, and also, in cooperation with the fuel injection valves 3a and 3b, functions as catalyst heating means for performing air-fuel ratio control and in turn, for heating the NOx catalyst 13a to carry out refresh operation. During the refresh operation, the opening of the ISC valve 8 is regulated to compensate the decrease in engine output caused by the correction of air-fuel ratio.

Next, the operation of the engine control apparatus configured as described above will be described with reference to FIG. 2.

Figure 2:
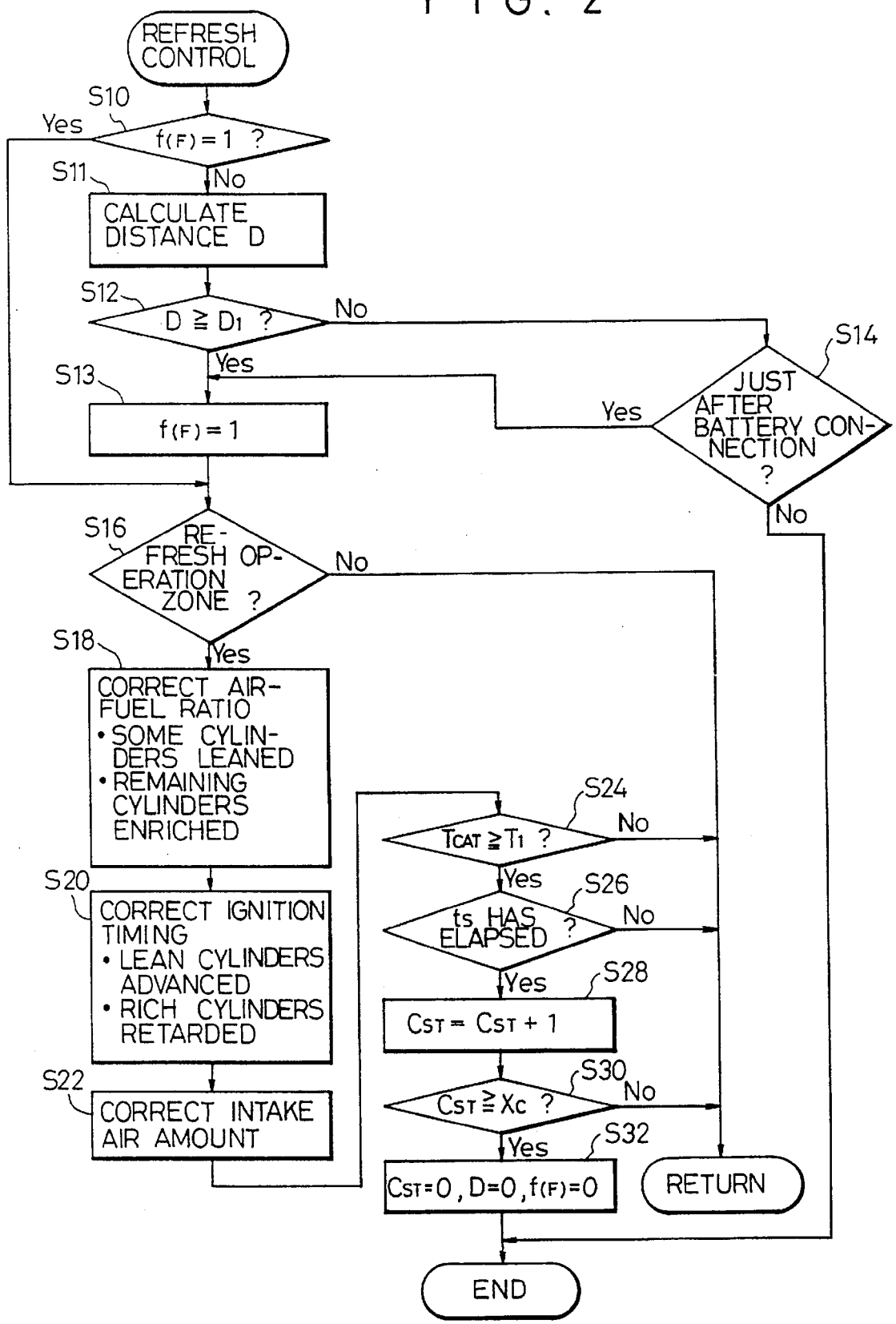
FIG. 2 is a flowchart for a refresh control routine executed by an electronic control unit.

When the engine 1 is started, a refresh control routine shown in FIG. 2 is started. This control routine is executed by the ECU 23 at predetermined cycles.

In the first execution cycle of the control routine, in Step S10, it is determined whether the value of flag f(F) is "1" indicating that the estimation of the amount of purifying capability reducing substances adhering to the NOx catalyst 13a is completed. Immediately after the engine start, the flag f(F) is reset to 0, so that the judgment result in Step S10 is No.

In this case, the control flow proceeds to Step S11, where a travel distance D from the completion of the previous refresh operation is calculated by the ECU 23, functioning as adsorption amount estimating means, on the basis of the travel distance data (the integrated value of vehicle speed pulse) from the distance recorder 25. The calculated travel distance D is stored in the memory device in the ECU 23. Since the amount of purifying capability reducing substances adhering to the NOx catalyst 13a is approximately proportional to the travel distance D, the travel distance D represents the adherence amount properly.

However, in the case where the ECU 23 has no battery backup function, if a battery, a power source for operating the ECU 23, is disconnected, the value of travel distance D stored in the memory device in the ECU 23 is reset to 0. Therefore, immediately after the battery is reconnected, the travel distance D read in Step S11 does not represent the actual travel distance or the amount of adhering purifying capability reducing substances, so that the estimation of adherence amount in Step S11 is inaccurate. To solve this problem, Step S13 described later is provided. Therefore, in the case where the ECU 23 has a battery backup function and the engine control apparatus is configured so that the travel distance is surely stored even if the battery is disconnected, Step S14 is unnecessary.

In Step S12, it is determined whether the travel distance D read in Step S10 is larger than a predetermined value $D_1$, by which it is determined whether the purifying capability reducing substances have reached a predetermined amount (allowable adherence amount). The predetermined value $D_1$ is set in advance at the value corresponding to the allowable adherence amount of purifying capability reducing substances, preferably the value (for example, 1000 km) corresponding to the value regulated by the law of NOx emission, on the basis of experiments or the like, and stored in the memory device in the ECU 23.

If the judgment result in Step S12 is No, that is, if the travel distance D does not reach the predetermined value $D_1$, the control flow proceeds to Step S14, where it is determined whether the travel distance D stored in the memory device in the ECU 23 is zero or near zero, by which it is determined whether the battery has just been reconnected.

If the judgment result in Step S14 is No, that is, if the battery has not just been reconnected, it is judged that the estimation of the amount of adhering purifying capability reducing substances based on the travel distance D, in Step S10, has been made properly. Therefore, the decision in Step S12 that the travel distance D does not yet reach the predetermined value $D_1$ is correct, and it can be judged that the amount of adhering purifying capability reducing substances does not reach the allowable limit. In this case, the refresh operation is unnecessary, and the refresh control routine ends.

If the judgment result in Step S12 is Yes, that is, if it is judged that the purifying capability reducing substance exceeds the predetermined amount, a flag f(F) is set at "1" indicating that the estimation of the amount of adhering purifying capability reducing substance has been completed, and the control flow proceeds to Step S16. Even if the judgment result in Step S12 is No, when the judgment result in Step S14 is Yes, the control flow proceeds to Step S16 through Step S13.

In Step S16, it is determined whether the engine 1 is operated in a medium or high operation zone (hereinafter called a refresh operation zone) in which the refresh operation is to be carried out, on the basis of the signal values from various sensors, which are operating condition detecting means.

In this embodiment, it is determined whether all of three conditions for refresh operation are met which relate to the engine rotational speed $N_e$, the volumetric efficiency $\eta_V$ representing the engine load $L_e$, and the coolant temperature $T_W$ and are represented by the following inequalities (1), (2), and (3).

$$N_{e1} \leq N_e \leq N_{e2} \quad (1)$$

$$\eta_{V1} \leq \eta_V \leq \eta_{V2} \quad (2)$$

$$T_{W1} \leq T_W \quad (3)$$

In these inequalities, $N_{e1}$ and $N_{e2}$ are the lower and upper limit values of the engine rotational speed region corresponding to the refresh operation zone, respectively, and $\eta_{V1}$ and $\eta_{V2}$ are lower and upper limit values of the volumetric efficiency region corresponding to the refresh operation zone, respectively. The threshold values $N_{e1}$, $N_{e2}$, $\eta_{V1}$, and $\eta_{V2}$ are preset at values defining the refresh operation zone (preferably, an engine operation zone in which the temperature of exhaust gas from the engine 1 is not lower than a predetermined temperature $T_{EX}$ (for example, 600° C.)), for example, at 1500 rpm, 5000 rpm, 30%, and 80%, respectively. $T_{W1}$ represents the lower limit value of the coolant temperature region suitable for the refresh operation, being set at, for example, 50° C. at which warm-up operation is regarded as being completed. The threshold values $N_{e1}$, $N_{e2}$, $\eta_{V1}$, $\eta_{V2}$ and $T_{W1}$ are stored in the memory device in the ECU 23.

If the judgment result in Step S16 is No, that is, if any of the values $N_e$, $\eta_V$, and $T_W$ is outside the above range, the execution of the refresh control routine in this cycle ends (hereinafter, called "the control flow returns to Step S10"). As long as any one of three conditions for refresh operation is not met, the refresh operation is not performed.

The following are the reasons for this: If the refresh operation is performed in a low load zone in which the engine rotational speed $N_e$ is lower than the threshold value $N_{e1}$ or the volumetric efficiency $\eta_V$ is lower than the threshold value $\eta_{V1}$, or if the refresh operation is performed at the cold engine time at which the coolant temperature $T_W$ is lower than the threshold value $T_{W1}$, the engine output becomes unstable, resulting possibly in the deterioration in driving feeling. In a heavy load zone in which the engine rotational speed $N_e$ is higher than the threshold value $N_{e2}$ or the volumetric efficiency $\eta_V$ is higher than the threshold value $\eta_{V2}$, the exhaust gas temperature is high, so that the temperature of the NOx catalyst 13a also becomes high. Therefore, if the refresh operation is performed in the heavy load zone, the NOx catalyst 13a is further heated, and may be burnt.

If it is judged, in Step S12 of the first control routine execution cycle, that the amount of adhering purifying capability reducing substances reaches the predetermined amount, the control routine is executed at the predetermined cycle. In this case, in Step S10 in the second and the subsequent control routine execution cycle, it is judged that f(F)=1; therefore, the control flow proceeds to Step S16. If the judgment result in Step S16 is No, the control flow returns to Step S10.

Afterward, if the judgment result in Step S16 is Yes, that is, if it is judged that all values of $N_e$, $\eta_V$, and $T_W$ are in the range represented by the above inequalities (1) to (3) and the engine 1 is operated in the refresh operation zone, the control flow proceeds to Step S18, and the refresh operation (here, the refresh operation for increasing the temperature of the NOx catalyst 13a) is started. At the same time, the accumulative counting (measuring) of the period elapsed time from the refresh operation start time (the time point at which the refresh operation starts) is started by means of the timer counter (time measuring means) in the ECU 23.

It should be noticed that even if the travel distance D does not reach the predetermined value $D_1$, when it is judged in Step S16 that the conditions for refresh operation are met after it is judged in Step S14 that the battery has just been reconnected, the refresh operation is forcedly started.

In Step S18, air-fuel ratio correction control is carried out for each cylinder. In the air-fuel correction control, the valve opening time of the fuel injection valves 3a and 3b for respective cylinders is controlled so that a mixture of an air-fuel ratio such that lean-combustion operation is performed in some cylinders (hereinafter called lean-combustion cylinders) of the engine 1 and rich-combustion operation is performed in the remaining cylinders (hereinafter called rich-combustion cylinders) is supplied to each cylinder. Specifically, a target lean air-fuel ratio LAF for lean-combustion cylinders and a target rich air-fuel ratio RAF for rich-combustion cylinders are calculated from the following equations (4) and (5).

$$LAF = AVAF + AVAF \times DAF/100 \quad (4)$$

$$RAF = AVAF + AVAF \times DAF/100 \quad (5)$$

where, AVAF is a target average air-fuel ratio, which is an average value of the lean air-fuel ratio LAF and the rich air-fuel ratio RAF, being usually set at a value not less than 13.7, for instance. DAF is an air-fuel ratio correction amount (%). This air-fuel ratio correction amount DAF is set on the basis of the engine rotational speed $N_e$ and the volumetric efficiency $\eta_V$ detected at the refresh operation start time from the DAF-$N_e$-$\eta_V$ map (not shown) preset in the memory device in the ECU 23.

During the air-fuel correction control, the actual air-fuel ratio is always monitored by the ECU 23 on the basis of the output signal from the air-fuel ratio sensor 12. If the actual air-fuel ratio does not agree with the average air-fuel ratio AVAF, the amount of fuel supplied to the lean-combustion cylinders and/or the rich-combustion cylinders and the amount of air supplied to these cylinders are appropriately corrected so that the difference between the actual air-fuel ratio and the average air-fuel ratio becomes zero.

Preferably, for the lean-combustion cylinders, the lean air-fuel ratio LAF is achieved by decreasing the amount of fuel with the amount of air being constant. For the rich-combustion cylinders, the rich air-fuel ratio RAF is achieved by decreasing the amount of air with the amount of fuel being constant. In this case, bypass passages (not shown) extending between respective cylinders of the engine and the upstream side of the throttle valve of the intake pipe 9 and valves (not shown) for regulating the flow rate of air passing through the bypass passages are provided so that the valve opening is regulated under the control of the ECU 23 to control the necessary amount of air.

When lean-combustion operation is performed in some cylinders of the engine 1 and rich-combustion operation is performed in the remaining cylinders, in the exhaust gas discharged from the engine 1, the air containing residual oxygen discharged from the lean-combustion cylinders and the fuel containing unburnt hydrocarbon discharged from the rich-combustion cylinders are present in a mixed manner. The exhaust gas is supplied to the NOx catalyst 13a via the exhaust pipe 14.

During the engine operation in the refresh operation zone, the NOx catalyst 13a is at a high temperature due to the heat of exhaust gas. Therefore, the unburnt hydrocarbon supplied to the NOx catalyst 13a burns in the NOx catalyst 13a in the presence of residual oxygen. As a result, the temperature of the NOx catalyst 13a rises rapidly, and by this high temperature, the purifying capability reducing substances (sulfur and the compounds thereof) adhering to the NOx catalyst 13a are burnt and removed.

During the lean-combustion operation, the engine output is decreased, while during the rich-combustion operation, the engine output is increased. Accordingly, in the case where lean-combustion operation is performed in some cylinders of the engine 1 and rich-combustion operation is performed in the remaining cylinders, even if the number of lean-combustion cylinders and the number of rich-combustion cylinders are equal, the engine output becomes nonuniform when the lean-combustion operation or the rich-combustion operation is performed continuously, resulting in deterioration in driving feeling.

To solve this problem, in this embodiment in which the control apparatus is applied to a six-cylinder V-type engine in which ignition is accomplished in the order of #1-#2-#3-#4-#5-#6 cylinder, #1, #3, and #5 cylinders of the first bank 1a are selected as the lean-combustion cylinders, and #2, #4, and #6 cylinders of the second bank 1b are selected as the rich-combustion cylinders, so that the lean-combustion operation and the rich-combustion operation are performed alternately in the engine 1.

In Step S20, ignition timing correction is effected for each cylinder. Specifically, the ignition timing in the lean-combustion cylinders is corrected so as to be advanced, by which the combustion in the lean-combustion cylinders is advanced to increase the combustion efficiency. On the other hand, the ignition timing in the rich-combustion cylinders is corrected so as to be retarded, by which the combustion in the rich-combustion cylinders is retarded to prevent the occurrence of knocking or the like.

To be concrete, L ignition timing (ignition timing in lean-combustion cylinders) and R ignition timing (ignition timing in rich-combustion cylinders) are set by the following equations (6) and (7).

$$L \text{ ignition timing} = O/L \text{ ignition timing} - k \times (LAF - O/L \text{ target } AF) \quad (6)$$

$$R \text{ ignition timing} = O/L \text{ ignition timing} + k \times (O/L \text{ target } AF - RAF) \quad (7)$$

where, O/L ignition timing is an ignition timing in ordinary lean-combustion operation, O/L target AF is a target air-fuel ratio in ordinary lean-combustion operation, and k is a proportionality factor determined from experiments or the like.

The equations (6) and (7) include the lean air-fuel ratio LAF and the rich air-fuel ratio RAF, respectively, as a variable. This means that the L ignition timing and the R ignition timing, like LAF and RAF, are set on the basis of the engine rotational speed $N_e$ and the volumetric efficiency $\eta_V$.

In Step S22, the opening of the ISC valve 8 is increasingly regulated to thereby increasingly correct the intake air amount. The intake air correction amount used for the intake air amount correction, like the air-fuel ratio correction amount DAF, is set on the basis of the engine rotational speed $N_e$ and the volumetric efficiency $\eta_V$ from the DAF-$N_e$-$\eta_V$ map stored in advance in the memory device in the ECU 23. The intake air amount correction increases the intake air amount, so that the decrease in engine output is prevented and the engine output is stably kept constant.

The intake air amount correction in Step S22 is especially useful for preventing the decrease in engine output caused by the execution of the refresh operation. For example, when the lean air-fuel ratio LAF is achieved by decreasing the amount of fuel for a constant amount of air and the rich air-fuel ratio RAF is achieved by decreasing the amount of air for a constant amount of fuel in the air-fuel ratio correction control in Step S18, the engine output is decreased as a whole as the result of the air-fuel ratio correction control. Such decrease in engine output can be prevented by the intake air amount correction in Step S22.

If the above-described air-fuel ratio correction, ignition timing correction, and intake air amount correction are performed rapidly, the operating condition of the engine 1 may be changed. Therefore, it is preferable that the respective corrected value be gradually brought close to the finally corrected value.

In Step S24, it is determined whether the catalyst temperature $T_{CAT}$ detected by the catalyst temperature sensor 26, which is catalyst temperature detecting means, is not lower than a predetermined temperature $T_1$. The predetermined temperature $T_1$ is set at a temperature value (for example, 650° C.) high enough to burn and remove the purifying capability reducing substances properly.

If the judgment result in Step S24 is No, that is, if the catalyst temperature $T_{CAT}$ is lower than the predetermined temperature $T_1$, the control flow returns to Step S10.

Thereafter, as long as it is again judged in Step S16 that the conditions for refresh operation are met, the refresh operation is continued while the accumulated refresh operation time is counted by the timer counter in the ECU 23, by which the temperature of the NOx catalyst 13a is further increased. However, if it is judged in Step S16 that the conditions for refresh operation are not met, the refresh operation is interrupted in that control routine execution cycle.

Afterward, if the judgment result in Step S24 is Yes, and it is judged that the catalyst temperature $T_{CAT}$ reaches the predetermined temperature $T_1$, the control flow proceeds to Step S26. In Step S26, it is determined whether a preset time period $t_s$ (for example, 5 seconds) has elapsed from the refresh operation start time. If the judgment result is No, and the preset time period $t_s$ has not elapsed, the control flow returns to Step S10. If it is judged again in Step S16 that the conditions for refresh operation are met, the refresh operation is continued while the accumulated refresh operation time is counted. However, if the conditions for refresh operation are not met, the refresh operation is interrupted.

Afterward, if the judgment result in Step S26 is Yes, and it is judged that the preset time period $t_s$ has elapsed, the control flow proceeds to Step S28. In Step S28, an increment value "1" is added to a count value $C_{ST}$ (initial value is zero) as shown in the equation (8) shown below. The increment value "1" corresponds to a reference time $X_t$ corresponding to the execution cycle of the refresh control routine in FIG. 2.

$$C_{ST} = C_{ST} + 1 \quad (8)$$

The updating of the count value $C_{ST}$ in Step S28 is performed only when all of the judgment results in Steps S16, S24, and S26 are Yes. Therefore, the count value $C_{ST}$ represents the number of executions of Step S28 after the preset time period $t_s$ has elapsed from the refresh operation start time and after the catalyst temperature $T_{CAT}$ reaches the predetermined temperature $T_1$. The product of the count value $C_{ST}$ and the reference time $X_t$ represents the net accumulated execution time of refresh operation after the preset time period $t_s$ has elapsed from the refresh operation start time .and after the catalyst temperature $T_{CAT}$ reaches the predetermined temperature $T_1$. This refresh operation is performed to intentionally remove the purifying capability reducing substances; therefore, hereinafter it is called refresh operation for removing purifying capability reducing substances.

In Step S30, it is determined whether the count value $C_{ST}$ is not lower than a predetermined value $X_C$. The predetermined value $X_C$ is set to a value obtained by dividing a predetermined time (for example, 60 seconds) by the reference time $X_t$, the predetermined time being enough to remove the purifying capability reducing substances, and being preset by experiments or the like. The value $X_C$ is stored in advance in the memory device in the ECU 23.

If the judgment result in Step S30 is No, that is, if the count value $C_{ST}$ does not reach the predetermined value $X_C$, it can be judged that the refresh operation for removing purifying capability reducing substances has not yet been performed over a predetermined time, and therefore the purifying capability reducing substances have not been removed sufficiently. In this case, the control flow returns to Step S10. Accordingly, as long as it is judged in Step 16 that the conditions for refresh operation are met, the refresh operation for removing purifying capability reducing substances is continued.

Thereafter, if the judgment result in Step S30 is Yes, that is, if the count value $C_{ST}$ reaches the predetermined value $X_C$, the purifying capability reducing substances can be regarded as being removed substantially perfectly. In this case, the control flow proceeds to Step S32, where the count value $C_{ST}$, the value of travel distance D, and the flag f(F)

are reset to zero, ready for the next refresh operation. Thus, the refresh control routine in FIG. 2 ends.

When the above-described refresh operation is performed, the unburnt hydrocarbon discharged from the rich-combustion cylinders is burnt at the NOx catalyst 13a in the presence of air containing residual oxygen discharged from the lean-combustion cylinders. By this combustion, the purifying capability reducing substances adhering to the NOx catalyst 13a are burnt and removed. Whereby, the NOx adsorbing ability (NOx purifying ability) of the NOx catalyst 13a is restored.

The engine control apparatus of the above-described first embodiment can be modified variously.

For example, although the case in which the control apparatus is applied to a six-cylinder V-type engine 1 is described in the first embodiment, the control apparatus of the first embodiment can be applied to an engine of any type with any number of cylinders; therefore, it can be applied to a six-cylinder in-line engine 1', for example.

For the six-cylinder in-line engine 1', the ignition order of cylinder is #1-#5-#3-#6-#2-#4 cylinder or #1-#4-#2-#6-#3-#5 cylinder. Therefore, #1, #2, and #3 cylinders are selected as the lean-combustion cylinders, and other #4, #5, and #6 cylinders are selected as the rich-combustion cylinders, by which the lean-combustion operation and the rich-combustion operation are performed alternately in the engine 1'.

Also, it is unnecessary to allocate half the number of cylinders to the lean-combustion cylinders and the rich-combustion cylinders. For example, two cylinders among six cylinders may be selected as the lean-combustion cylinders, and the remaining four cylinders may be selected as the rich-combustion cylinders. Further, the application of the present invention is not limited to an engine with even number of cylinders such as six cylinders, but the present invention can be applied to an engine with odd number of cylinders such as five cylinders. In this case, although the number of lean-combustion cylinders and the number of rich-combustion cylinders are not equal, the air-fuel ratio of the mixture supplied to respective cylinders may be regulated so that the amount of residual oxygen contained in the exhaust gas from the lean-combustion cylinders and the amount of unburnt hydrocarbon discharged from the rich-combustion cylinders are in the proper proportions.

Next, an engine control apparatus in accordance with a second embodiment of the present invention will be described.

The apparatus of this embodiment is common to the apparatus of the first embodiment in that an NOx catalytic device is heated when the estimated amount of purifying capability reducing substances adhering to the NOx catalytic device reaches a predetermined amount to remove the purifying capability reducing substances from the catalytic device, but the apparatus differs from the apparatus of the first embodiment, in which the amount of adhering purifying capability reducing substances is estimated on the basis of the travel distance, in that the amount of adhering purifying capability reducing substances is estimated on the basis of the accumulated value of fuel consumption of the engine. Further, the apparatus of this embodiment differs from the apparatus of the first embodiment in that the apparatus is especially suitable for a vehicle which is provided with a power plant in which an engine and an automatic transmission are installed so that they are permitted to be connected directly with each other by means of a lockup clutch.

Figure 5:
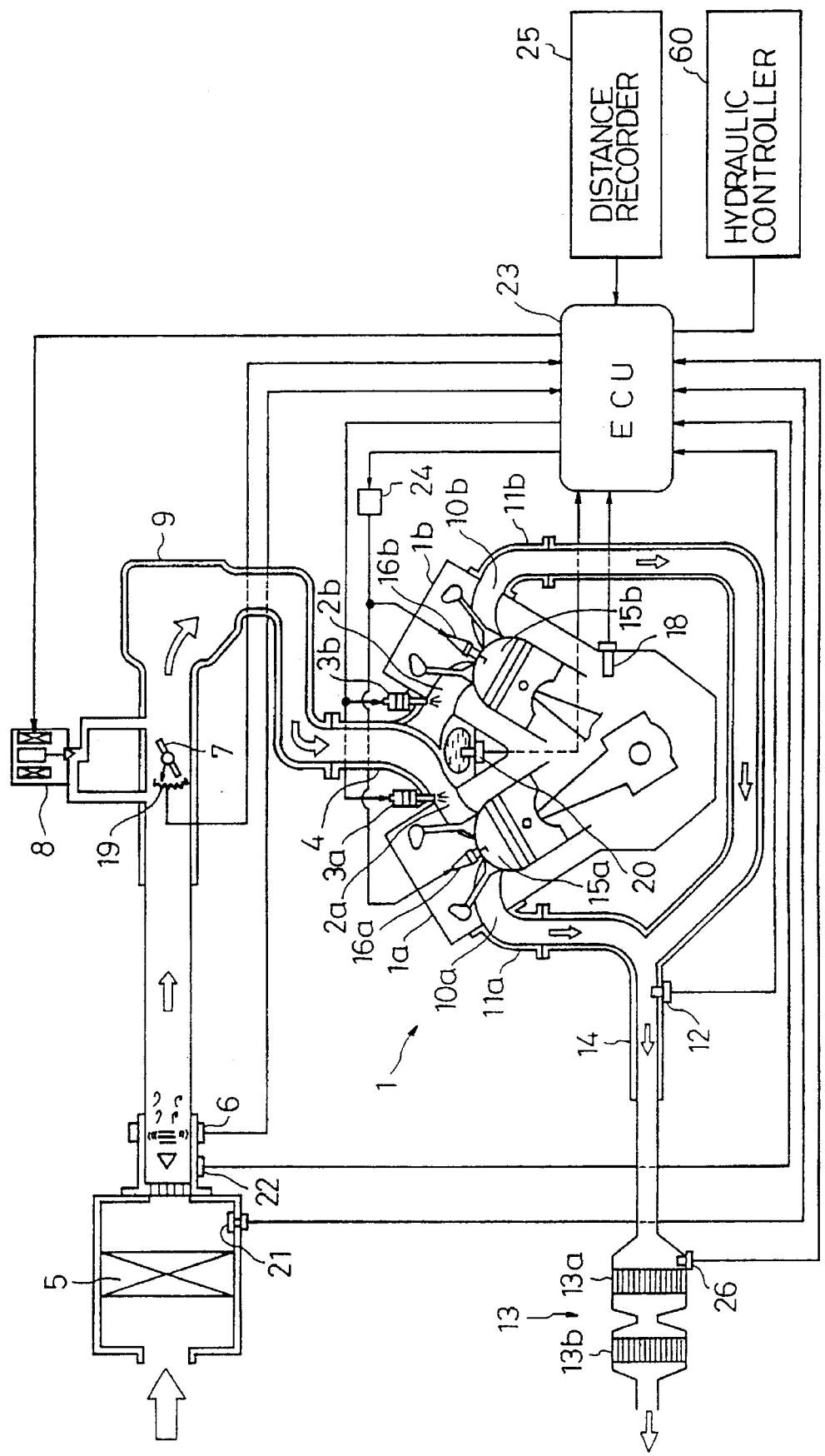
FIG. 5 is a schematic view showing an engine control apparatus according to a second embodiment of the present invention, similar to FIG. 1.

As shown in FIG. 5, a six-cylinder V-type gasoline engine on which the engine control apparatus of this embodiment is mounted and peripheral elements thereof are basically configured like those shown in FIG. 1. Therefore, the same reference numerals are applied to elements in FIG. 5 which are essentially the same as the elements in FIG. 1, and the explanation of the elements is omitted. In FIG. 5, reference numeral 60 denotes a hydraulic controller, which will be described later.

Figure 6:
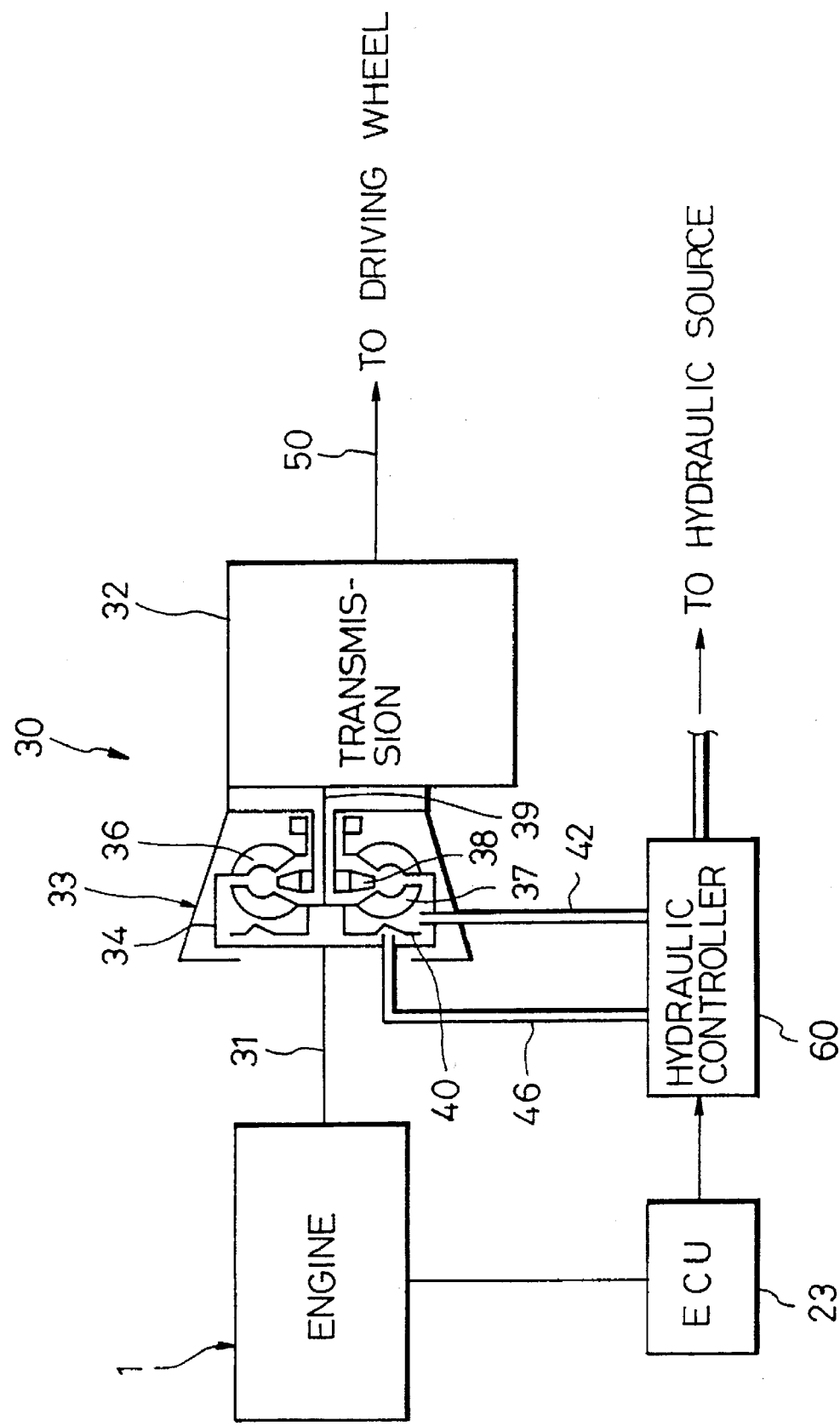
FIG. 6 is a schematic view of a power plant for a vehicle on which the engine shown in FIG. 5 is mounted.

As shown in FIG. 6, the power plant of the vehicle is provided with an automatic transmission 30 comprising a transmission 32 and a torque converter 33. The input side of the automatic transmission 30 is connected to an output shaft 31 of an engine 1, and the output shaft 50 is connected to driving wheels (not shown) of the vehicle via a differential gear or the like.

The transmission 32 incorporates hydraulic friction-engaging elements such as hydraulic clutches and hydraulic brakes in addition to a plurality of sets of planetary gears. Here, the detailed description of the transmission 32 is omitted.

The torque converter 33 includes a housing 33, a casing 34, a pump 36, a turbine 37, a stator 38, and other elements. The casing 34, being connected to the engine output shaft 31, rotates in synchronization with the output shaft 31. The turbine 37 is connected to the input shaft 39 of the transmission 32, and the stator 38 is installed to the housing 33 via a one-way clutch (not shown).

The casing 34 is filled with hydraulic fluid. This hydraulic fluid is discharged by the pump 36 rotating together with the output shaft 31 to rotate the turbine 37. Whereby, the torque converter 33 functions as a fluid coupling, and the output of the engine 1 is transmitted to the driving wheels via the transmission 32.

A wet type single plate damper clutch (lockup clutch) 40 is interposed between the casing 34 and the turbine 37. The engagement of this damper clutch 40 with the casing 34 connects the output shaft 31 of the engine 1 directly to the input shaft 39 of the transmission 32. When the element 40 is disengaged from the element 34, the direct connection between the element 31 and the element 32 is released. Between a hydraulic source 61 and respective one end of oil passages 42 and 46 is interposed a control valve (not shown) incorporated in the hydraulic controller 60. The other end of the oil passage 42 is open to a position between the turbine 37 and the damper clutch 40. The other end of the oil passage 46 is open to a position between the casing 34 and the damper clutch 40. The control valve takes a first or second operating position according to a pilot pressure which changes in accordance with the presence of damper clutch control signal from the ECU 23.

Specifically, when the control valve takes the first operating position in accordance with the damper clutch control signal from the ECU 23, the oil passage 46 communicates with the hydraulic source, and the oil passage 42 communicates with the drain side of the hydraulic circuit. Thereupon, the hydraulic fluid from the hydraulic source is supplied to between the casing 34 and the damper clutch 40 through the oil passage 46. On the other hand, the hydraulic fluid in the casing 34 is discharged from the oil passage 42 between the turbine 37 and the damper clutch 40. Whereby, the pressure between the casing 34 and the damper clutch 40 is increased, and the damper clutch 40 is pressed to the side opposite to the casing 34, by which the damper clutch 40 is not connected directly to the casing 34. In this disconnected state, the torque converter 33 functions as an ordinary fluid coupling.

When the damper clutch control signal from the ECU 23 disappears and the control valve takes the second operating position, the hydraulic fluid from the hydraulic source is supplied to between the turbine 37 and the damper clutch 40 through the oil passage 42, and the hydraulic fluid between the casing 34 and the damper clutch 40 is discharged from the oil passage 46. Whereby, the damper clutch 40 is pressed to the side of the casing 34, so that the damper clutch 40 is connected directly to the casing 34. In such a directly connected state, the output from the engine output shaft 31 is directly transmitted to the input shaft 39 without using the hydraulic fluid. In this case, the torque converter 33 does not function as a fluid coupling.

Next, the operation of the engine control apparatus configured as described above will be described.

Figure 7:
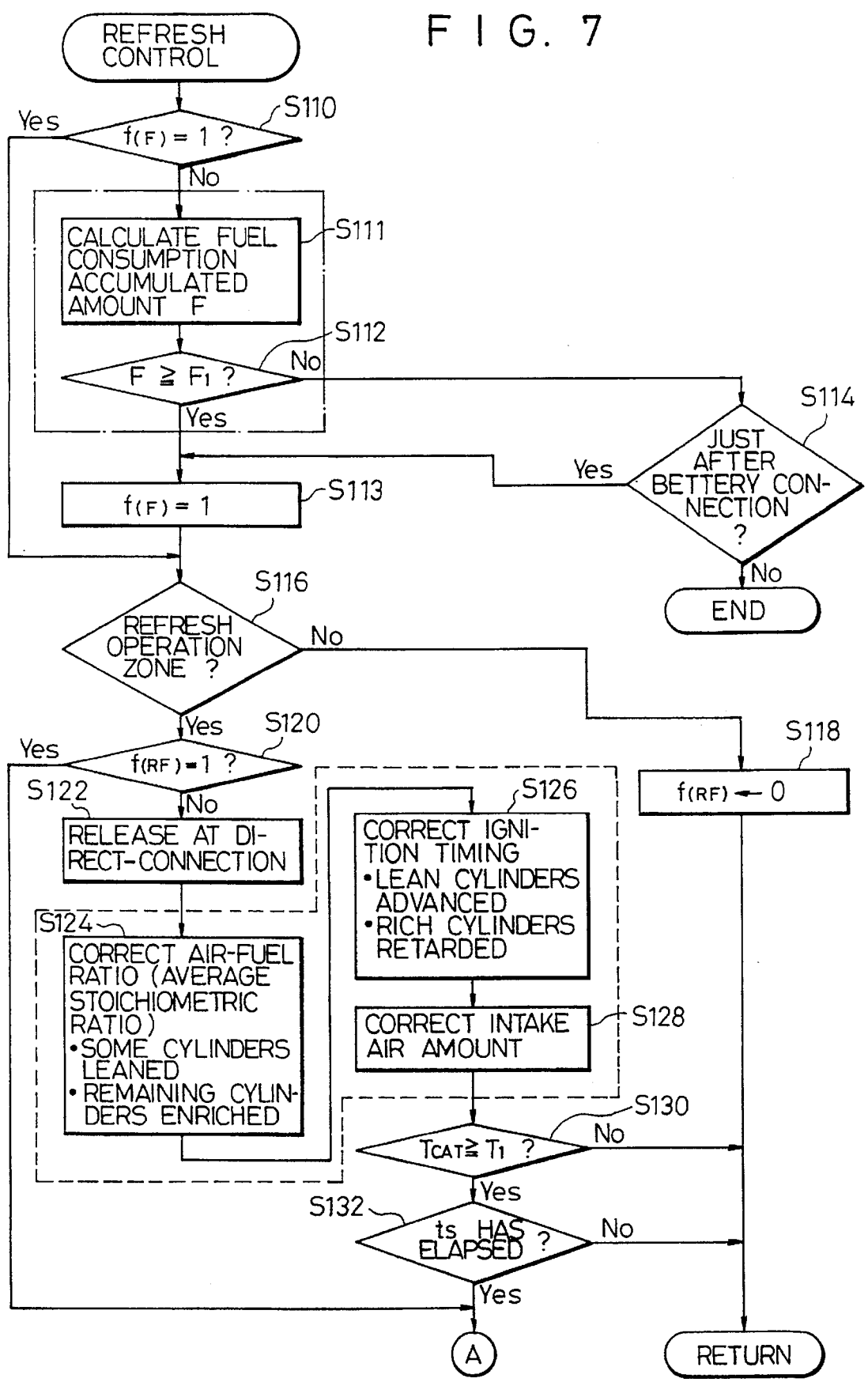
FIG. 7 is a flowchart showing part of a refresh control routine executed by the electronic control unit shown in FIG. 5.
Figure 8:
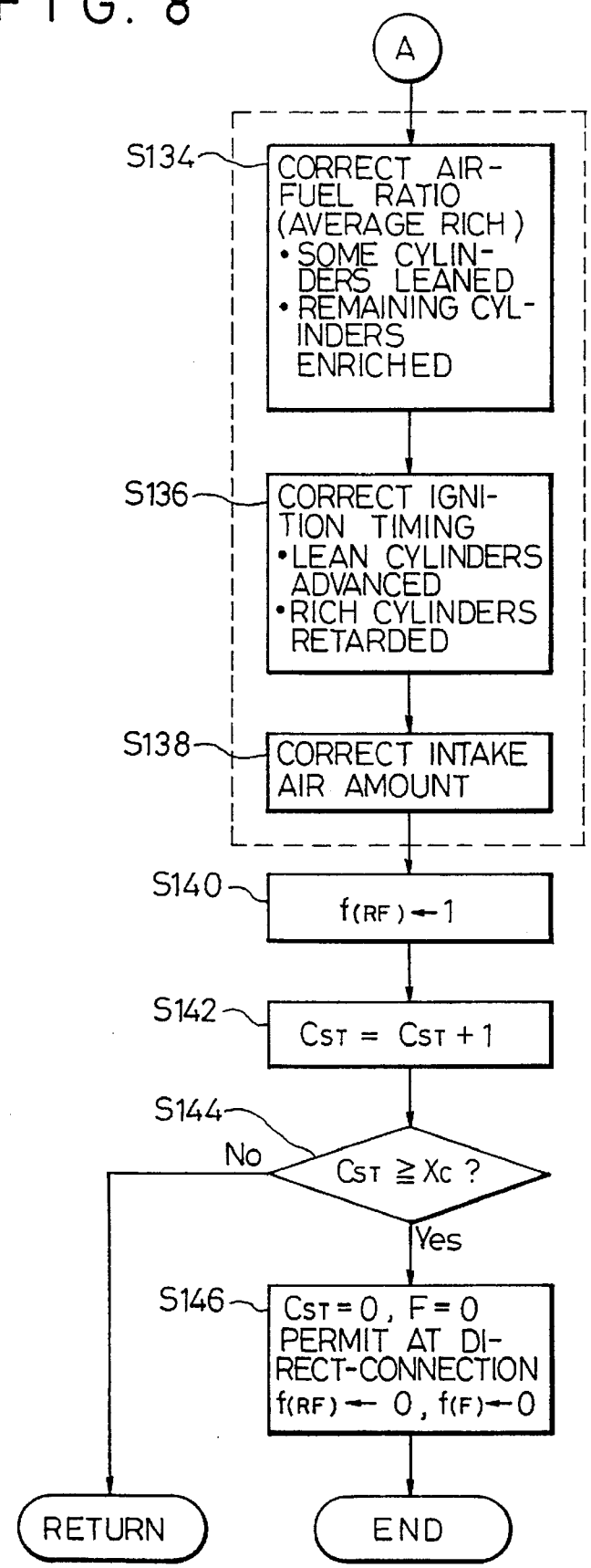
FIG. 8 is a flowchart showing the remaining part of the refresh control routine following FIG. 7.

Each time the engine 1 is started, the refresh control routine shown in FIGS. 7 and 8 is executed by the ECU 23. This control routine is similar to that shown in FIG. 2; therefore, the description of the steps common to both control routines are partially omitted.

First, since the engine has just been started, in Step S110 corresponding to Step S10 in FIG. 2, it is judged that the value of the flag f(F) is not "1", so that the control flow proceeds to Step S111 corresponding to Step S11 in FIG. 2. In this Step S111, the ECU 23 determines the accumulated value of pulse width of current signal for driving the fuel injection valves 3a and 3b, calculates the fuel consumption accumulated amount F of the engine 1 on the basis of the accumulated pulse width, and thereby estimates the amount of purifying capability reducing substances adhering to the NOx catalyst 13a. Since the amount of adhering purifying capability reducing substances is approximately proportional to the fuel consumption accumulated amount F, the fuel consumption accumulated amount F represents the amount of purifying capability reducing substances adhering to the NOx catalyst 13a.

The fuel consumption accumulated amount F may be determined from the accumulated value of all pulse widths of the driving current supplied to the fuel injection valves 3a and 3b. However, since the purifying capability reducing substances tend to adhere to the NOx catalyst 13a during the lean-combustion operation, it is preferable that the fuel consumption accumulated amount F be determined on the basis of only the accumulated pulse width of driving current supplied to the fuel injection valves 3a of the lean-combustion cylinders (#1, #3, and #5 cylinders in FIG. 3). Further, considering that the purifying capability reducing substances easily adhere to the NOx catalyst 13a when the NOx catalyst temperature is not higher than a predetermined temperature, the amount of adhering purifying capability reducing substances can be estimated more properly if the fuel consumption accumulated amount F is determined on the basis of only the accumulated pulse width of driving current supplied to the fuel injection valves 3a of the lean-combustion cylinders when the catalyst temperature is not higher than the predetermined temperature.

In Step S112 (corresponding to Step S12 in FIG. 2), it is determined whether the fuel consumption accumulated amount F calculated in Step S111 is not less than a predetermined value F1, by which it is determined whether the amount of adhering purifying capability reducing substances has reached a predetermined amount. This predetermined value is set at the value corresponding to the allowable amount of adhering purifying capability reducing substances, preferably the value corresponding to the value regulated by the law of NOx emission.

If the judgment result in Step S112 is Yes, it can be judged that the amount of adhering purifying capability reducing substances has exceeded the predetermined amount, so that the control flow proceeds to Step 116 corresponding to Step S16 in FIG. 2 through Step S113 corresponding to Step S13 in FIG. 2. If the judgment result in Step S112 is No, that is, if it is judged that the fuel consumption accumulated amount F does not reach the predetermined value $F_1$, the control flow proceeds to Step S114 corresponding to Step S14 in FIG. 2. If the judgment result in Step S114 is No, the refresh control routine ends. If the judgment result in Step S114 is Yes, that is, if it is judged that the battery has just been reconnected, the control flow proceeds to Step S116 through Step S113.

In Step S116, like the case of Step S16 in FIG. 2, it is determined whether three conditions for refresh operation, represented by equations (1), (2), and (3), are met at the same time.

If the judgment result in Step S116 is No, a flag f(RF) is reset to "0", the value indicating that the refresh operation is not being executed, in Step S118, and the control flow returns to Step S110. If the judgment result in Step S116 is Yes, that is, if all of the three conditions for refresh operation are met, the control flow proceeds to Step S120 to start the refresh operation. At the same time, the counting of the elapsed time from the refresh operation start time is started by means of the timer counter in the ECU In Step S120, it is determined whether the value of the flag f(RF) is "1". When the judgment result first becomes Yes, and therefore just after three conditions for refresh operation are met, the value of the flag f(RF) remains being reset to zero, so that the judgment result in Step S120 is No. In this case, the control flow proceeds to Step S122.

In Step S122, a damper clutch control signal is sent from the ECU 23 to the hydraulic controller 60. Whereby, the damper clutch 40 of the automatic transmission 30 becomes in the disconnected state, and the torque converter 33 functions as an ordinary fluid coupling. Therefore, even when the output of the engine 1 is varied by the execution of the refresh operation, described later, the variation in engine output is not transmitted directly to the output side of the automatic transmission 30, so that the deterioration in driving feeling can be prevented. If the damper clutch 40 has already been in the disconnected state when Step S122 is being executed, the disconnected state is continued.

The next Steps S124, S126, and S128 make up a temperature-increase mode operation, of the refresh operation, for increasing the temperature $T_{CAT}$ of the NOx catalyst 13a to a predetermined temperature (for example, 650° C.) high enough to burn and remove the purifying capability reducing substances from the NOx catalyst 13a. This temperature-increase mode operation corresponds to the refresh operation for increasing the temperature of the NOx catalyst 13a in the first embodiment. Steps S124, S126, and S128 correspond to Steps S18, S20, and S22 in FIG. 2.

Briefly describing, in Step S124, like Step S18 in FIG. 1, air-fuel correction control is carried out so that the air-fuel ratios of the mixtures supplied to the lean-combustion cylinders and the rich-combustion cylinders are the lean air-fuel ratio LAF and the rich air-fuel ratio RAF represented by equations (4) and (5), respectively. However, unlike the first embodiment, in which the average air-fuel ratio AVAF is set at 13.7, the average air-fuel ratio AVAF is set at the theoretical air-fuel ratio (14.7) in this embodiment. Therefore, the temperature of the NOx catalyst 13a can be raised without increasing the contaminant in exhaust gas. In Step S126, like Step S20 in FIG. 2, ignition timing correction is effected in accordance with equations (6) and (7) so that the ignition timing in the lean-combustion cylinders is corrected so as to be advanced and the ignition timing in the rich-combustion cylinders is corrected so as to be retarded. In Step S128, like Step S22 in FIG. 2, intake air amount correction is effected to prevent the decrease in engine output caused by the refresh operation.

When the temperature-increase mode operation is performed as described above, the temperature of the NOx catalyst 13a is raised rapidly; the temperature $T_{CAT}$ of the NOx catalyst 13a reaches the predetermined temperature $T_1$ (650° C.) high enough to burn and remove the purifying capability reducing substances adhering to the NOx catalyst 13a.

In Step S130 (corresponding to Step S24 in FIG. 2), it is determined whether the catalyst temperature $T_{CAT}$ has reached the predetermined temperature $T_1$. If this judgment result is No, that is, if the catalyst temperature $T_{CAT}$ is lower than the predetermined temperature $T_1$, the control flow returns to Step S110. If the judgment result in Step S130 is Yes, i.e., if it is judged that the catalyst temperature $T_{CAT}$ has reached the predetermined temperature $T_1$, the control flow proceeds to Step S132 corresponding to Step S26 in FIG. 2, where it is determined whether a preset time period $t_s$ has elapsed from the temperature-increase mode operation start time. If this judgment result is No, i.e., if the preset time period $t_s$ has not elapsed, the control flow returns to Step S110. If the judgment result in Step S132 is Yes, i.e., if it is judged that the preset time period $t_s$ has elapsed, the control flow proceeds to Step S134.

Steps S134, S136, and S138 make up a refresh mode operation, of the refresh operation, where the temperature of the NOx catalyst 13a, which has reached the predetermined temperature $T_1$ (650° C.), is kept at the predetermined temperature $T_1$, by which the purifying capability reducing substances are burnt and removed from the NOx catalyst 13a substantially perfectly. The refresh mode operation corresponds to the refresh operation for removing purifying capability reducing substances in the first embodiment.

In this refresh mode operation, like the above-described temperature-increase mode operation, after air-fuel ratio correction is first effected in Step S134, ignition timing correction is made in Step S136, and then intake air amount correction is made in Step S138.

In the air-fuel ratio correction in Step S134, unlike the temperature-increase mode operation, the average air-fuel ratio AVAF is set at a value richer than the theoretical air-fuel ratio, for example, 13.7. The lean air-fuel ratio LAF and the rich air-fuel ratio RAF are determined from equations (4) and (5) described above by using the average air-fuel ratio value of 13.7, and the air-fuel ratio of each cylinder is corrected on the basis of the results.

If the average air-fuel ratio AVAF is set at a value on the rich side as described above, the exhaust gas contains more CO and HC than the exhaust gas in the temperature-increase mode operation. The CO and HC react with the purifying capability reducing substances, by which the purifying capability reducing substances are removed satisfactorily. The NOx reducing action of HC simultaneously removes NOx adsorbed by the NOx catalyst 13a.

In Step S136, like the temperature-increase mode operation, L ignition timing in the lean-combustion cylinders and R ignition timing in the rich-combustion cylinders are corrected properly so as to fit the lean air-fuel ratio LAF and the rich air-fuel ratio RAF, which are corrected and set in Step S134, respectively. In Step S138, like the temperature-increase mode operation, intake air amount correction is made by regulating the ISC valve 8 to the valve open side to compensate the decrease in engine output.

In Step S140, a flag f(RF) is set at "1" indicating that the refresh mode operation is being executed. In Step S142, corresponding to Step 28 in FIG. 2, a count value $C_{ST}$ representing the accumulated time from the refresh mode operation start time is updated (refer to equation (8)). In Step S144, corresponding to Step S30 in FIG. 2, it is determined whether the count value $C_{ST}$ has reached a predetermined value $X_C$ corresponding to the predetermined time.

If the judgment result in Step S144 is No, that is, if the count value $C_{ST}$ has not reached the predetermined value $X_C$, it is judged that the refresh mode operation is not yet executed over the predetermined time, and therefore the removal of purifying capability reducing substances is insufficient. In this case, the control flow returns to Step S110. If it is again judged in Step S116 that the conditions for refresh operation are met, the control flow proceeds to Step S120. Here, since the flag f(RF) has already been set at "1" indicating that the refresh mode operation is being executed, the judgment result in Step S120 is Yes. In this case, the control flow proceeds to Step S134. Therefore, the refresh mode operation is performed without executing the temperature-increase mode operation.

If the conditions for refresh operation are not met though the refresh mode operation has once been started, so that the judgment result in Step S116 is No, the control flow proceeds to Step S118, where the value of flag f(RF) is reset to zero, and then the control flow returns to Step S110.

If the value of flag f(RF) is thus reset to zero once, the judgment result in Step S120 is No even if it is again Judged in Step S116 that the conditions for refresh operation are met. Therefore, the damper clutch 40 is disconnected in Step S122, and in and after Step S124, the temperature-increase mode operation is executed again. Thereupon, even if the catalyst temperature $T_{CAT}$ is decreased by the interruption of the refresh mode operation, the catalyst temperature can be returned again to the predetermined temperature $T_1$. If the conditions for refresh operation fail to be met during the temperature-increase mode operation, the temperature-increase mode operation is started again when the conditions for refresh operation are met.

If the judgment result in Step S144 is Yes, i.e., if it is judged that the count value $C_{ST}$ representing the accumulated time has reached the predetermined value $X_C$ corresponding to the predetermined time, the purifying capability reducing substances can be regarded as being removed substantially perfectly. In this case, the control flow proceeds to Step S146, where the count value $C_{ST}$, the fuel consumption accumulated amount F, the flag f(F), and the flag f(RF) are reset to zero, and further the AT disconnection is reset so that the damper clutch 40 of the automatic transmission 30 can be connected directly, thereby being ready for the next execution of refresh operation. Thus, the refresh control routine shown in FIGS. 7 and 8 ends.

When the refresh operation including the temperature-increase mode operation and the refresh mode operation is performed as described above, like the first embodiment, the unburnt hydrocarbon discharged from the rich-combustion cylinders is burnt at the NOx catalyst 13a in the presence of the air containing residual oxygen discharged from the lean-combustion cylinders. By this combustion, the purifying capability reducing substances adhering to the NOx catalyst 13a are burnt and removed. Whereby, the NOx adsorbing ability (NOx purifying ability) of the NOx catalyst 13a is restored. Since HC is contained in the exhaust gas passing through the NOx catalyst 13a during the refresh mode operation, NOx is also deoxidized satisfactorily by this HC and removed.

The engine control apparatus of the second embodiment described above can be modified variously.

For example, although in the second embodiment, the amount of adhering purifying capability reducing substances is estimated on the basis of the fuel consumption accumulated amount F, an effect similar to that obtained from the estimation based on the fuel consumption accumulated amount F can be achieved when estimation is made on the basis of the travel distance D, the intake air accumulated amount A, or the running time H of the engine 1. In this case, the travel distance D is determined by means of the distance recorder 25 (travel distance accumulating means), like the first embodiment. The intake air accumulated amount A is determined by calculating the accumulated value of vortex pulse number of the Karman vortices air flow sensor 6 (intake air amount accumulating means). The running time H is determined by counting the time during which the engine 1 operates by means of, for example, a timer.

Figure 9:
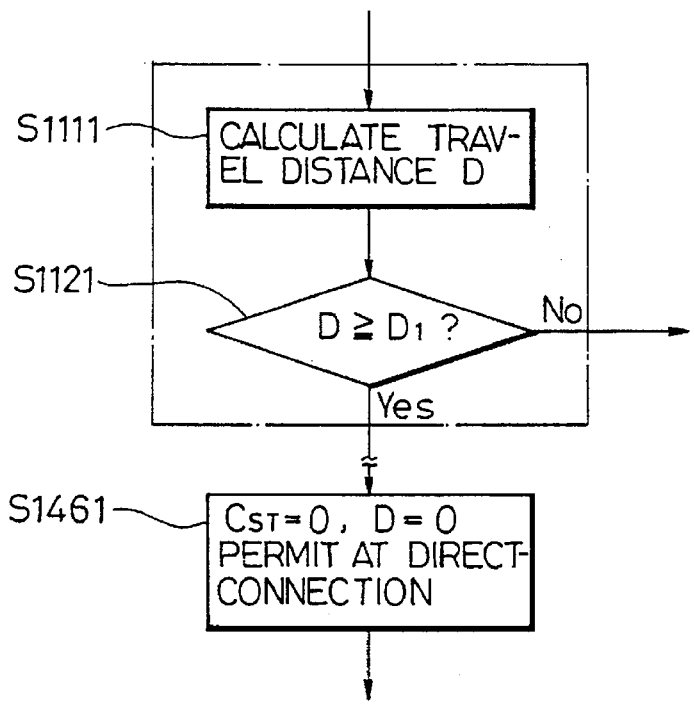
FIG. 9 is a flowchart showing a principal part of the refresh control routine in accordance with a modification of the second embodiment.

To estimate the amount of adhering purifying capability reducing substances by using the travel distance D, as shown in FIG. 9, the adherence amount estimating steps S111 and S112 in FIG. 7 are replaced by Step S1111 for calculating the travel distance D and Step S1121 for determining whether the travel distance D has reached a predetermined value $D_1$ (for example, 1000 km), respectively. Further, Step S146 in FIG. 8 for resetting the fuel consumption accumulated amount F is replaced by Step S1461 for resetting the travel distance D to zero.

Figure 10:
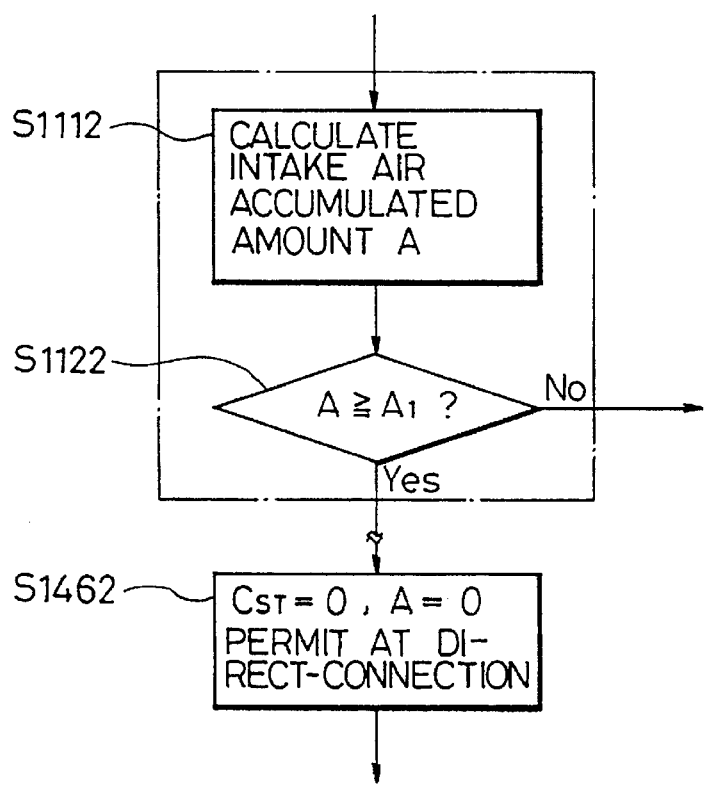
FIG. 10 is a flowchart showing a principal part of the refresh control routine in accordance with another modification of the second embodiment.

When the amount of adhering purifying capability reducing substances is estimated by using the intake air accumulated amount A, as shown in FIG. 10, the adherence amount estimating steps S111 and S112 in FIG. 7 are replaced by Step S1112 for calculating the intake air accumulated amount A and Step S1122 for determining whether the intake air accumulated amount A has reached a predetermined value $A_1$, respectively. Further, Step S146 in FIG. 8 for resetting the fuel consumption accumulated amount F is replaced by Step S1462 for resetting the intake air accumulated amount A to zero.

Figure 11:
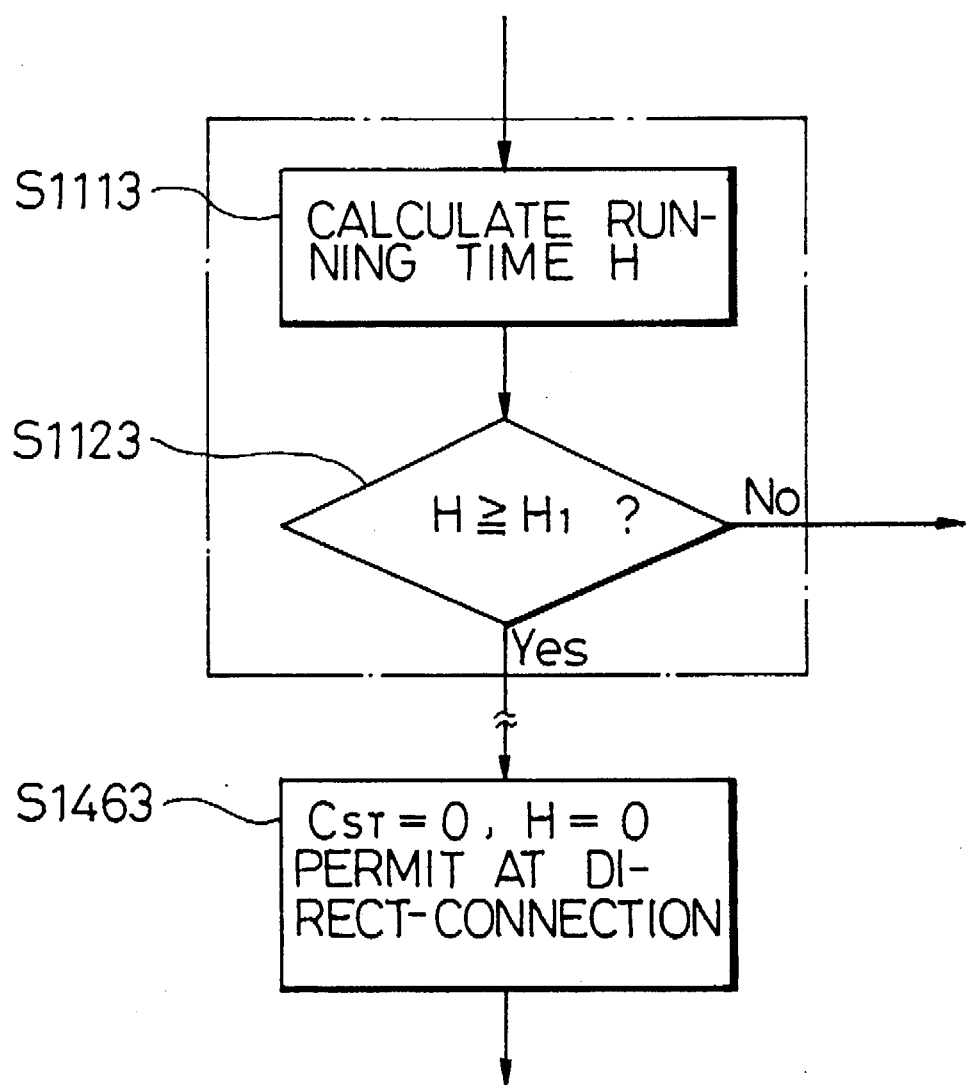
FIG. 11 is a flowchart showing a principal part of the refresh control routine in accordance with still another modification of the second embodiment.

To make estimation by using the running time H, as shown in FIG. 11, the adherence amount estimating steps S111 and S112 in FIG. 7 are replaced by Step S1113 for calculating the running time H and Step S1123 for determining whether the running time H has reached a predetermined value $H_1$, respectively. Further, Step S146 in FIG. 8 for resetting the fuel consumption accumulated amount F is replaced by Step S1463 for resetting the running time H to zero.

In the second embodiment, only when all judgment results of the operating condition determining step S116, the catalyst temperature determining step S130, and the elapsed time determining step S132 are Yes, the count value $C_{ST}$ representing the accumulated time is increased in increments. However, the increment condition for the count value is not always limited to this. For example, even if the count value $C_{ST}$ is increased in increments when only the judgment results in Steps S116 and S130 are Yes, or when only the judgment results in Steps S116 and S130 are Yes, an effect similar to that of the second embodiment can be achieved. Also, a significant effect can be expected even if the count value $C_{ST}$ is increased in increments when only the judgment result in Step S116 is Yes.

Also, in the second embodiment, the fixed predetermined value (the predetermined value $F_1$ when the fuel consumption accumulated amount F is used, the predetermined value $D_1$ when the travel distance D is used, the predetermined value $A_1$ when the intake air accumulated amount A is used, and the predetermined value $H_1$ when the running time H is used) is used as a criterion for judging the amount of adhering purifying capability reducing substances. Alternatively, the predetermined value, which is a criterion, may be variable so that the predetermined value takes a smaller value gradually as the application time of the NOx catalyst 13a increases, considering that the deterioration in catalyst proceeds as the catalyst application time increases. In this case, as the application time of the NOx catalyst 13a increases, the refresh operation can be performed easily, being effective.

Although the case where the control apparatus is applied to a six-cylinder V-type engine is described in the second embodiment, the engine control apparatus of the second embodiment can be applied to an engine of any type.

Next, an engine control apparatus in accordance with a third embodiment of the present invention will be described.

The apparatus of this embodiment is common to the apparatus of the first and second embodiments in that an NOx catalytic device is heated when the estimated amount of purifying capability reducing substances adhering to the NOx catalytic device reaches a predetermined amount to remove the purifying capability reducing substances from the catalytic device, but the apparatus differs from the apparatus of the first and second embodiments as to the method for heating the NOx catalytic device (temperature-increase mode operation). The apparatus of this embodiment is characterized in that the burning state of engine is changed so that the temperature of the exhaust gas from the engine increases by correcting the ignition timing of the engine, thereby increasing the temperature of the NOx catalytic device.

The engine control apparatus of this embodiment is configured in the same manner as the apparatus shown in FIG. 1, and can be applied to an engine having the same configuration as that of the engine 1 shown in FIG. 1. Therefore, the explanation of the configuration of the engine control apparatus and the engine is omitted.

Next, the operation of the engine control apparatus in accordance with the third embodiment of the present invention will be described.

Figure 12:
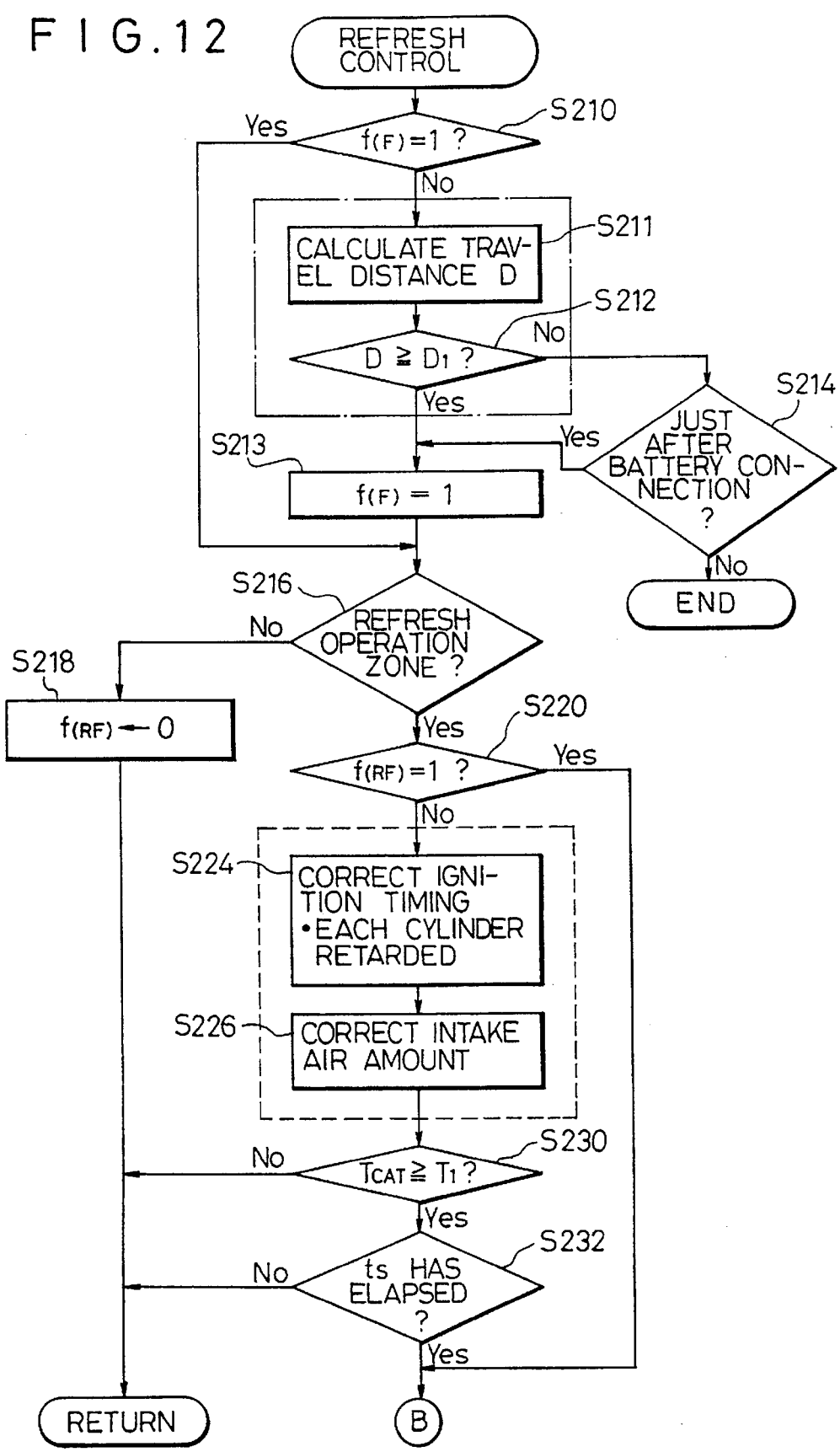
FIG. 12 is a flowchart showing part of a refresh control routine executed by an electronic control unit of an engine control apparatus in accordance with a third embodiment of the present invention.
Figure 13:
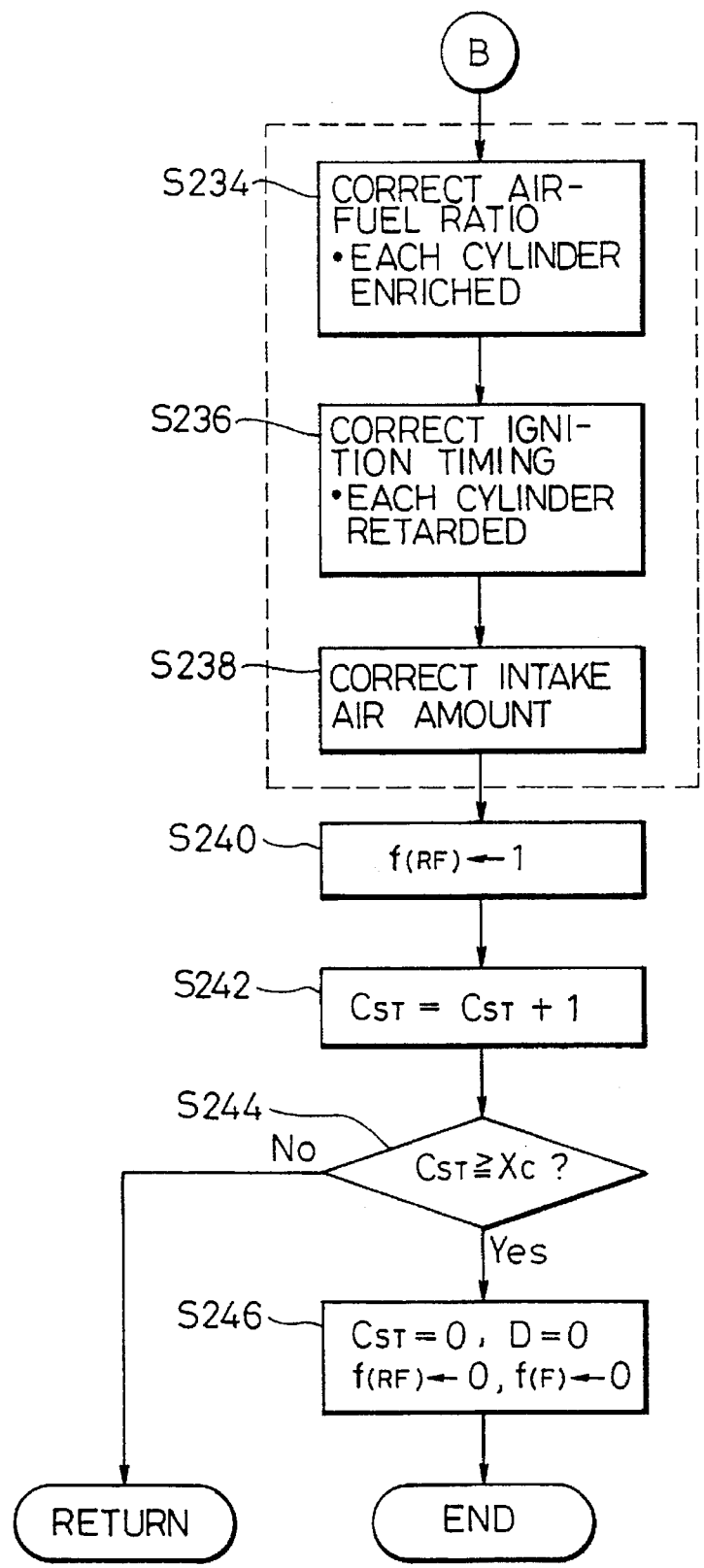
FIG. 13 is a flowchart showing the remaining part of the refresh control routine following FIG. 12.

Each time the engine 1 is started, the refresh control routine shown in FIGS. 12 and 13 is executed by the ECU 23. This control routine is similar to that shown in FIG. 2 and that shown in FIGS. 7 and 8; therefore, the description of the steps common to these three control routines are partially omitted.

First, Steps S210, S211, and S212, corresponding to Steps S10, S11, and S12 in FIG. 2, are executed in sequence so that the amount of the purifying capability reducing substances adhering to the NOx catalyst 13a is estimated, and it is determined whether the estimated amount has reached a predetermined amount.

If the judgment result in Step S212 is Yes, that is, if it is judged that the amount of the purifying capability reducing substances exceeds the predetermined amount, the control flow proceeds to Step S216, corresponding to Step S16 in FIG. 2, through Step S213, corresponding to Step S13 in FIG. 2. If the judgment result in Step S212 is No, the control flow proceeds to Step S214, corresponding to Step S14 in FIG. 2. If the judgment result in Step S214 is No, the refresh control routine ends. On the other hand, if the judgment result in Step S214 is Yes, i.e., if it is judged that the battery has just been reconnected, the control flow proceeds to Step S216 through Step S213.

In Step S216, like Step S16 in FIG. 2, it is determined whether the three conditions for refresh operation, represented by equations (1), (2), and (3), are met at the same time.

If the judgment result in Step S216 is No, in Step S218, corresponding to Step S118 in FIG. 7, a flag f(RF) is reset to "0" indicating that the refresh operation is being executed, and the control flow returns to Step S210. If the judgment result in Step S216 is Yes, i.e., if all of the three conditions for refresh operation are met, the control flow proceeds to Step S220, corresponding to Step S120 in FIG. 7 to start the refresh operation, where it is determined whether the value of a flag f(RF) is "1". At the same time, the counting of the elapsed time from the refresh operation start time is started by using the timer counter in the ECU 23.

Just after three conditions for refresh operation are met at the same time, the value of the flag f(RF) remains being reset to zero, so that the judgment result in Step S220 is No. In this case, the temperature-increase mode operation (corresponding to the temperature-increase mode operation in the second embodiment) is started to increase the temperature $T_{CAT}$ of the NOx catalyst 13a to a predetermined temperature $T_1$ (for example, 650° C.) high enough to burn and remove the purifying capability reducing substances from the NOx catalyst 13a.

In this temperature-increase mode operation, first, in Step S224, ignition timing correction is effected so that the ignition timing in all cylinders of the engine 1 is retarded. The correction amount (retard angle amount) used for this ignition timing correction is determined on the basis of the engine rotational speed $N_e$ and the volumetric efficiency $\eta_V$ from a correction amount—$N_e$-$\eta_V$ map stored in advance in the ROM in the ECU 23.

If the ignition timing in all cylinders of the engine 1 is retarded, combustion is not yet completed and continues even when the exhaust valve of cylinder is opened. Therefore, the exhaust gas discharged from the engine 1 is discharged into the exhaust pipe 14 while being burnt, so that the temperature of the exhaust gas is high.

In Step S226, like Step S128 in FIG. 7, intake air amount correction is effected to prevent the decrease in engine output caused by the temperature-increase mode operation. The correction amount used for this intake air amount correction is determined from the correction amount—$N_e$-$\eta_V$ map stored in the ROM in the ECU 23, like the ignition timing correction. The opening of the ISC valve 8 is increasingly corrected in accordance with the correction amount read from this map, so that the intake air amount correction is effected properly.

If the intake air correction amount is large and the correction cannot be made sufficiently by the control of opening of the ISC valve 8, a bypass pipe for bypassing the throttle valve 7 and an air bypass valve for changing the cross-sectional area of the pipe (both are not shown) may be provided so that the intake air amount is increased by the operation of the air bypass valve.

When the temperature-increase mode operation is performed as described above, the temperature of the NOx catalyst 13a is increased rapidly, and the temperature $T_{CAT}$ of the NOx catalyst 12a reaches the predetermined temperature $T_1$ (650° C.) high enough to burn and remove the purifying capability reducing substances adhering to the NOx catalyst 13a.

In Step S230 (corresponding to Step S130 in FIG. 7), it is determined whether the catalyst temperature $T_{CAT}$ has reached the predetermined temperature $T_1$. If the judgment result is No, the control flow returns to Step S210. If it is judged that the catalyst temperature $T_{CAT}$ has reached the predetermined temperature $T_1$, the control flow proceeds to Step S232, corresponding to Step S132 in FIG. 7, where it is determined whether a preset time period $t_s$ has elapsed from the temperature-increase mode operation start time. If this judgment result is No, the control flow returns to Step S210. If it is judged in Step S132 that the preset time period $t_s$ has elapsed, the refresh mode operation (corresponding to the refresh mode operation in the second embodiment) is started to keep the temperature of the NOx catalyst 13a at the predetermined temperature $T_1$, to thereby burn and remove the purifying capability reducing substances from the NOx catalyst 13a substantially perfectly.

In this refresh mode operation, the air-fuel ratio correcting step S234 similar to Step S134 in FIG. 8, and the ignition timing correcting step S236 and the intake air amount correcting step S238, which correspond to Steps S136 and S138 in FIG. 8, respectively, are executed in sequence.

In the air-fuel ratio correction in Step S234, the air-fuel ratio in all cylinders of the engine 1 is corrected to a value (for example, 13.7) richer than the theoretical air-fuel ratio by using a correction amount obtained from an air-fuel ratio—$N_e$-$\eta_V$ map (not shown). Alternatively, the air-fuel ratio in all cylinders is set at a fixed rich air-fuel ratio. As a result, the CO and HC contained in large amounts in the exhaust gas react with the purifying capability reducing substances, by which the purifying capability reducing substances are removed satisfactorily. The NOx reducing action of HC simultaneously removes NOx adsorbed by the NOx catalyst 13a.

In Step S236, L ignition timing in the lean-combustion cylinders and R ignition timing in the rich-combustion cylinders are corrected properly in accordance with equations (7) and (8) so as to fit the lean air-fuel ratio LAF and the rich air-fuel ratio RAF, which are corrected and set in Step S234, respectively. In Step S238, intake air amount correction is made by regulating the ISC valve 8 to the valve open side to compensate the decrease in engine output.

Then, Steps S240, S242, and S244, corresponding to Steps S140, S142, and S144 in FIG. 8, are executed in sequence. In Step S240, a flag f(RF) is set at "1" indicating that the refresh mode operation is being executed. In Step S242, a count value $C_{ST}$ representing the accumulated time from the refresh mode operation start time is updated. In Step S244, it is determined whether the count value $C_{ST}$ has reached a predetermined value $X_C$ corresponding to the predetermined time.

If it is judged in Step S244 that the count value $C_{ST}$ does not reach the predetermined value $X_C$, the control flow returns to Step S210. If it is again judged in Step S216 that the conditions for refresh operation are met, the control flow proceeds to Step S220. Since the flag f(RF) has already been set at "1" indicating that the refresh mode operation is being executed, the judgment result in Step S220 is Yes, and the control flow proceeds to Step S234, by which the refresh mode operation is performed.

If the conditions for refresh operation are not met though the refresh mode operation has once been started, i.e., if the judgment result in Step S216 is No, the control flow proceeds to Step S218, where the value of flag f(RF) is reset to zero, and then the control flow returns to Step S210.

If the value of flag f(RF) is thus reset to zero once, the judgment result in Step S220 is No even if it is again judged in Step S216 that the conditions for refresh operation are met. Therefore, the temperature-increase mode operation is executed again in and after Step S224.

If it is judged in Step S244 that the count value $C_{ST}$ has reached the predetermined value $X_C$, the control flow proceeds to Step S246, corresponding to Step S32 in FIG. 2, where the count value $C_{ST}$, the travel distance D, the flag f(F), and the flag f(RF) are reset to zero, ready for the next execution of refresh operation. Thus, the refresh control routine in FIGS. 12 and 13 ends.

Next, an engine control apparatus in accordance with a fourth embodiment of the present invention will be explained.

The apparatus of this embodiment is basically configured in the same manner as the third embodiment and operates in the same way. However, the apparatus of this embodiment differs from that of the third embodiment, in which the temperature of the NOx catalyst 13a is raised by executing the temperature control of combustion gas by ignition timing correction, in that the temperature of the NOx catalytic device is increased by burning the unburnt HC contained in the exhaust gas by supplying secondary air into the exhaust gas.

Figure 14:
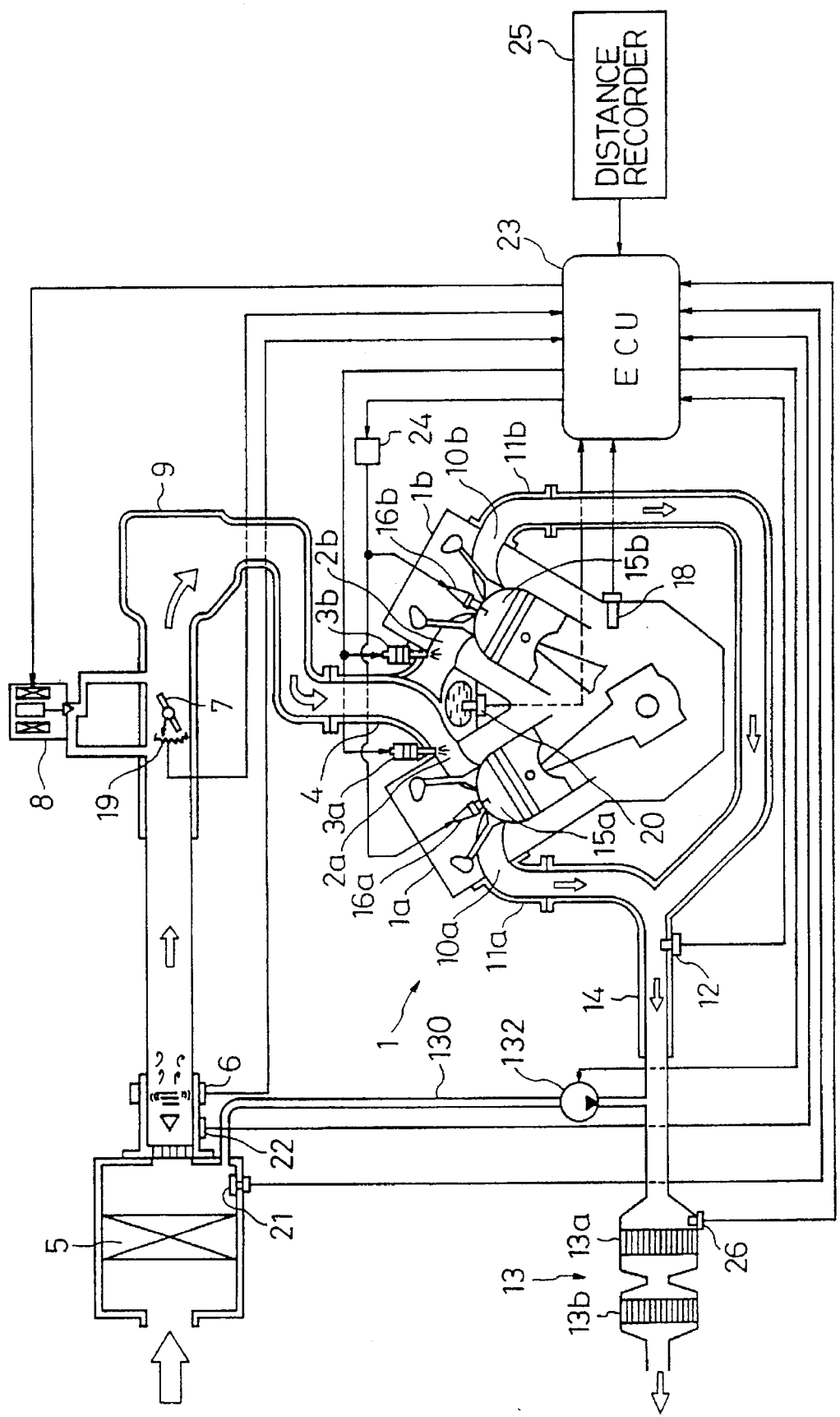
FIG. 14 is a schematic view showing an engine control apparatus according to a fourth embodiment of the present invention, showing together with peripheral elements.

Regarding this difference, as shown in FIG. 14, the engine control apparatus of this embodiment has a secondary air introducing pipe 130 extending from the air cleaner 5 to the exhaust pipe 14, and an air pump 132 installed halfway in the secondary air introducing pipe 130 to supply secondary air to the exhaust pipe 14, so that secondary air is supplied into the exhaust pipe 14 as necessary. For the air pump 132, the pump output can be controlled by changing the pump driving current value or the like.

Next, the operation of the engine control apparatus shown in FIG. 14 will be described.

Figure 15:
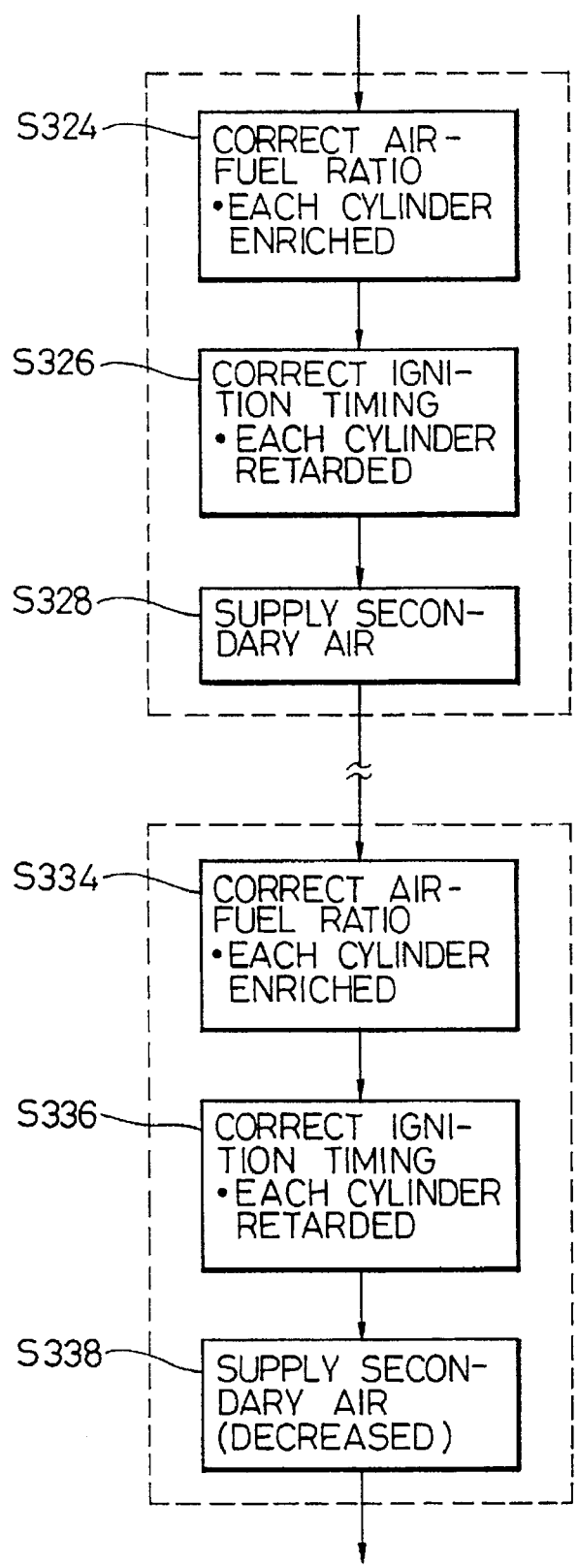
FIG. 15 is a flowchart showing temperature-increase mode operation steps and refresh mode operation steps of a refresh control routine executed by the electronic control unit shown in FIG. 14.

When the engine 1 is started, the same refresh control routine as that shown in FIGS. 12 and 13 is executed by the ECU 23 except for the temperature-increase mode operation steps S324, S326, and S328, and the refresh mode operation steps S334, S336, and S338 shown in FIG. 15. Therefore, the control flow other than the temperature-increase mode operation and the refresh mode operation will be described briefly.

If it is judged that the estimated amount of purifying capability reducing substances adhering to the NOx catalyst 13a does not yet reach the predetermined amount, and that the battery has not just been reconnected (Steps S210, S212, and S214 in FIG. 12), the control flow returns to Step S210. If it is judged that the adherence amount has reached the predetermined amount, or that the battery has just been reconnected, it is determined whether three conditions for refresh operation are met at the same time (Step S216). If this judgment result is No, the value of flag f(RF) is reset to "0" (Step S218). If this judgment result is Yes, the temperature-increase mode operation is started.

In the temperature-increase mode operation, first, in Step S324 in FIG. 15, air-fuel ratio correction is made in the same way as Step S234 in FIG. 13 so that the air-fuel ratio in all cylinders of the engine 1 is corrected to the rich side, by which much unburnt HC is contained in the exhaust gas.

In Step S326, ignition timing correction is made in the same way as Step S224 in FIG. 13, so that the ignition timing of all cylinders is corrected so as to be retarded. Whereby, the temperature of exhaust gas is increased.

In Step S328, the air pump 132 is operated, so that secondary air whose amount is determined from a map (not shown) based on the engine rotational speed $N_e$ and the volumetric efficiency $\eta_V$ is supplied into the exhaust pipe 14 via the secondary air introducing pipe 130. At this time, much unburnt HC is contained in the exhaust gas as the result of the execution of air-fuel ratio correction in Step S324, and further the exhaust gas temperature reaches a high temperature zone as the result of the execution of ignition timing correction in Step S326. Therefore, the unburnt HC burns in the presence of oxygen in secondary air, by which the exhaust gas temperature further increases. The passage of this high-temperature exhaust gas rapidly increases the temperature $T_{CAT}$ of the NOx catalyst 13a.

Afterward, as long as the conditions for refresh operation are met, the above-described temperature-increase mode operation is continued. If it is judged that the catalyst temperature $T_{CAT}$ has reached the predetermined temperature $T_1$, and that a preset time period $t_s$ has elapsed from the temperature-increase mode operation start time (Steps S230 and S232 in FIG. 12), the refresh mode operation is started.

In this refresh mode operation, like the temperature-increase mode operation, air-fuel ratio correction is made to correct the air-fuel ratio of all cylinders of the engine 1 to the rich side (Step S334 in FIG. 15), and then ignition timing correction is made to correct the ignition timing of all cylinders of the engine 1 so as to be retarded (Step S336), and secondary air is supplied into the exhaust pipe 14.

The refresh mode operation is intended to keep the catalyst temperature $T_{CAT}$ at the predetermined temperature $T_1$. Therefore, in Step S338, the output of the air pump 132 is decreasingly controlled so that the minimum amount of secondary air necessary for the combustion of unburnt HC needed to keep the catalyst temperature is supplied. For the same reason, the correction amount used for the air-fuel ratio correction in Step S334 and/or the ignition timing correction in Step S336 may be set at a value lower than that for the temperature-increase mode operation. If the air-fuel ratio correction, the ignition timing correction, and supply of secondary air are executed rapidly, the engine operating condition varies, resulting in the deterioration in the driving feeling. It is therefore preferable that the air-fuel correction amount, the ignition timing correction amount, and the secondary air supply amount be changed gradually.

As described above, in the refresh mode operation, unburnt HC remains in the exhaust gas from the cylinders as the result of the air-fuel ratio correction to the rich side in Step S334. This remaining unburnt HC reacts, at a high temperature, with the purifying capability reducing substances burnt and removed from the NOx catalyst 13a. Thereupon, the purifying capability reducing substances are removed reliably without adhering to the NOx catalyst 13a again.

Next, an engine control apparatus in accordance with a fifth embodiment of the present invention will be described.

The apparatus of this embodiment is common to the apparatuses of the third and fourth embodiments in that the temperature-increase mode operation for increasing the NOx catalyst temperature is performed before the refresh mode operation, but it differs from the apparatuses of the third and fourth embodiments, in which ignition timing correction and supply of secondary air (in a broad sense, engine combustion control) are executed, in that the NOx catalyst temperature is increased by using means other than the engine combustion control.

Figure 16:
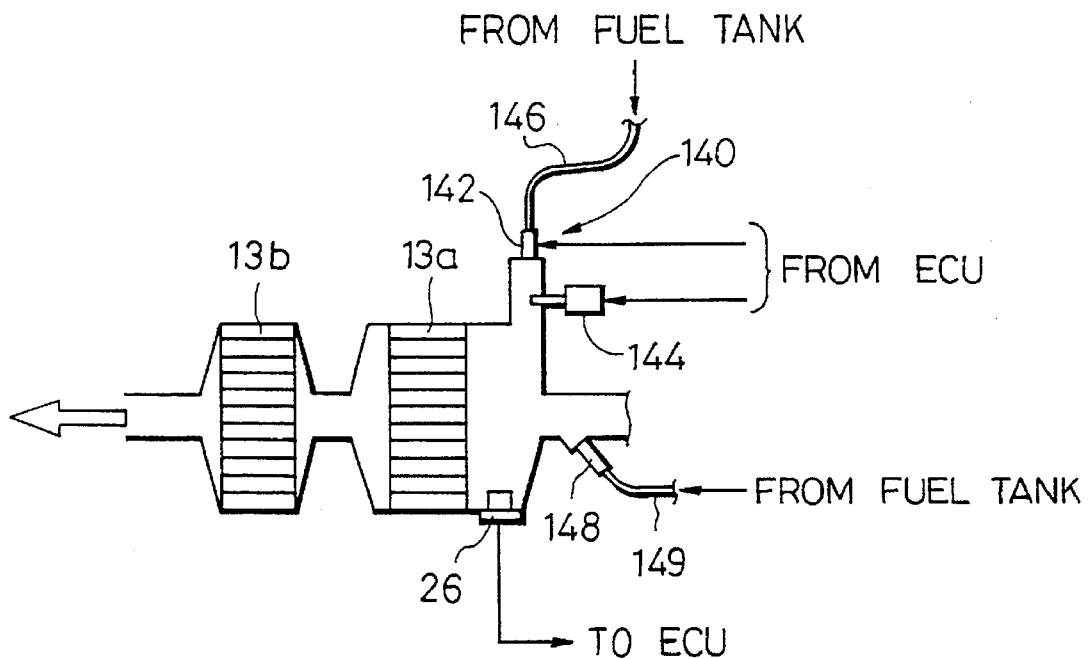
FIG. 16 is a fragmentary schematic view showing a principal part of an engine control apparatus according to a fifth embodiment of the present invention.

Regarding this difference, as shown in FIG. 16, the engine control apparatus of this embodiment has a burner 140 for heating the NOx catalyst 13a. The burner 140 comprises a fuel injection nozzle 142, an ignition device 144, and an auxiliary nozzle 148, which are operated under the control of the ECU 23. The nozzles 142 and 148 are disposed on the upstream side of the NOx catalyst 12a, and connected to a fuel tank (not shown) via fuel pipes 146 and 149, respectively. It is preferable that a gasoline fuel which is the same as the fuel supplied to the engine 1 be supplied to the nozzles 142 and 148. The auxiliary nozzle 148 may be omitted. When it is omitted, fuel should be injected amply from the fuel injection nozzle 142.

The engine control apparatus of this embodiment and the engine operated under the control of the apparatus can be configured in the same way as those shown in FIG. 14 in other respects; therefore, the explanation of the configuration is omitted.

Next, the operation of the engine control apparatus of the fifth embodiment will be described.

Figure 17:
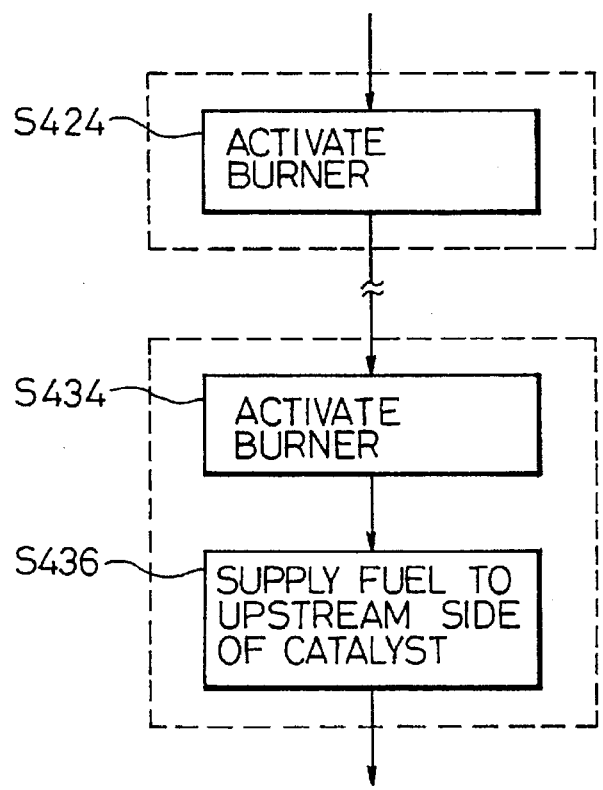
FIG. 17 is a flowchart showing temperature-increase mode operation steps and refresh mode operation steps of a refresh control routine executed by the engine control apparatus of the fifth embodiment of the present invention.

When the engine 1 is started, the same refresh control routine as that shown in FIGS. 12 and 13 is executed by the ECU 23 except for the temperature-increase mode operation step S424 and the refresh mode operation steps S434 and S436 shown in FIG. 17. Therefore, the control flow other than the temperature-increase mode operation and the refresh mode operation will be described briefly.

If three conditions for refresh operation are met at the same time after the estimated amount of purifying capability reducing substances adhering to the NOx catalyst 13a has reached the predetermined amount, or just after the battery has reconnected, the temperature-increase mode operation is started.

In the temperature-increase mode operation, in Step S424 in FIG. 17, the fuel injection nozzle 142 and the ignition device 144 of the burner 140 are driven. As a result, the fuel injected from the nozzle 142 is ignited, so that the injected fuel is burnt in the presence of residual oxygen contained in the exhaust gas, by which the NOx catalyst 13a is heated, and the temperature $T_{CAT}$ of the NOx catalyst 13a rapidly increases to the predetermined temperature $T_1$. To better burn the fuel injected from the fuel injection nozzle 142, an air intake valve (not shown) may be installed near the nozzle 142 so that the air intake valve is opened in connection with the operation of the nozzle 142.

Afterward, as long as the conditions for refresh operation are met, the temperature-increase mode operation entailing the operation of the burner 140 is continued. If it is judged that the catalyst temperature $T_{CAT}$ has reached the predetermined temperature $T_1$, and that a preset time period $t_s$ has elapsed from the temperature-increase mode operation start time, the refresh mode operation is started.

In the refresh mode operation, the burner 140 operates in Step S434 to keep the catalyst temperature $T_{CAT}$ at the predetermined temperature $T_1$. Whereby, the purifying capability reducing substances are burnt and removed sufficiently. At this time, it is preferable that the amount of fuel injected from the nozzle 142 be decreased to the minimum amount necessary to keep the predetermined temperature $T_1$ by decreasing the opening of the fuel injection nozzle 142. In Step S436, the auxiliary nozzle 148 is driven. Whereby, the fuel injected from the nozzle 148 is forcedly mixed in the exhaust gas. As a result, the exhaust gas passing through the NOx catalyst 13a contains much HC, which reacts, at a high temperature, with the purifying capability reducing substances burnt and removed from the NOx catalyst 13a, so that the purifying capability reducing substances are removed reliably.

According to the above-described refresh operation, the NOx purifying ability of the NOx catalyst 13a can be restored without deteriorating the operating condition of the engine 1.

Next, an engine control apparatus in accordance with a sixth embodiment of the present invention will be described.

The apparatus of this embodiment is common to the apparatus of the fifth embodiment in that the NOx catalyst temperature is raised by using means other than the engine combustion control, but the apparatus differs from the apparatus of the fifth embodiment, in which the burner 140 is used to heat the catalyst, in that exhaust gas flow velocity control is carried out as catalyst temperature increasing means.

Figure 18:
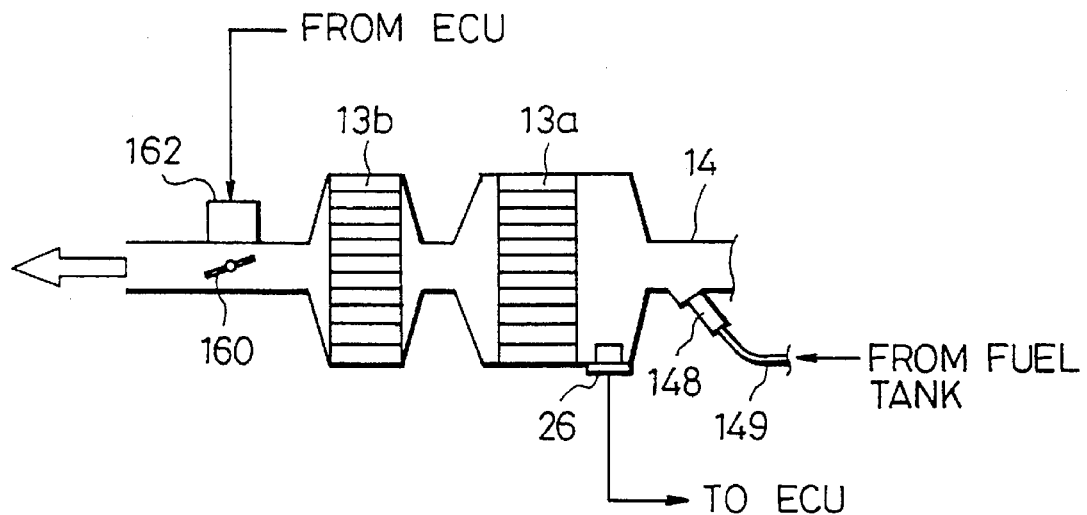
FIG. 18 is a fragmentary schematic view showing a principal part of an engine control apparatus according to a sixth embodiment of the present invention.

Regarding this difference, as shown in FIG. 18, the engine control apparatus of this embodiment has a throttle valve 160 disposed on the downstream side of the NOx catalyst 13a in the exhaust pipe 14, and a valve driving device 162 for driving the throttle valve 160 under the control of the ECU 23. The throttle valve 160 is opened and closed in a predetermined range of opening by the valve driving device 162, by which the cross-sectional area of passage of the exhaust pipe 14 is changed. When the valve driving device 162 is not operated, the opening of the throttle valve 160 and in turn the cross-sectional area of exhaust passage are maximized, so that normal exhaust is effected.

Like the fifth embodiment, an auxiliary fuel injection nozzle 148 is provided on the upstream side of the NOx catalyst 13a to supply fuel to the NOx catalyst 13a. This nozzle 148 is connected to a fuel tank (not shown) via a fuel pipe 149.

The engine control apparatus of this embodiment and the engine operated under the control of the apparatus can be configured in the same way as those shown in FIG. 14 in other respects; therefore, the explanation of the configuration is omitted.

Next, the operation of the engine control apparatus of the sixth embodiment will be described.

Figure 19:
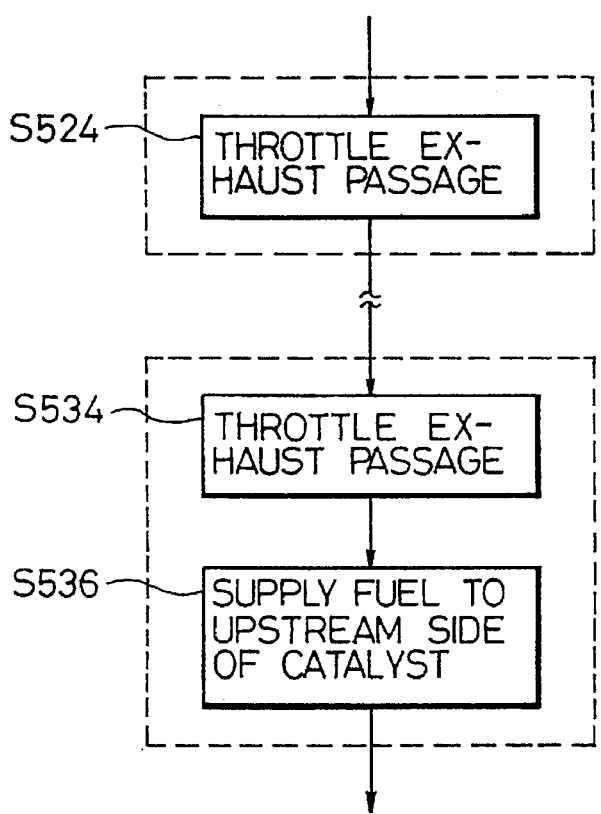
FIG. 19 is a flowchart showing temperature-increase mode operation steps and refresh mode operation steps of a refresh control routine executed by the engine control apparatus of the sixth embodiment of the present invention.

When the engine 1 is started, the same refresh control routine as that shown in FIGS. 12 and 13 is executed by the ECU 23 except for the temperature-increase mode operation step S524 and the refresh mode operation steps S534 and S536 shown in FIG. 19. Therefore, the control flow other than the temperature-increase mode operation and the refresh mode operation will be described briefly.

If the conditions for refresh operation are met after the estimated amount of purifying capability reducing substances adhering to the NOx catalyst 13a has reached the predetermined amount, or just after the battery has reconnected, the temperature-increase mode operation is started.

In the temperature-increase mode operation, in Step S524 in FIG. 19, the valve driving device 162 is driven, by which the throttle valve 160 is operated to the valve closing side to a predetermined opening, resulting in the decrease in the cross-sectional area of passage of the exhaust pipe 14. As a result, the exhaust gas becomes less prone to pass through the throttle valve 160, so that the flow velocity of the whole exhaust gas is decreased. Accordingly, the residence time of exhaust gas in the NOx catalyst 13a is increased, so that the heat of the exhaust gas is easily transmitted to the NOx catalyst 13a. By this heat, the NOx catalyst 13a is heated, and the catalyst temperature $T_{CAT}$ reaches the predetermined temperature $T_1$.

Afterward, as long as the conditions for refresh operation are met, the temperature-increase mode operation entailing the operation of the throttle valve 160 is continued. If it is judged that the catalyst temperature $T_{CAT}$ has reached the predetermined temperature $T_1$, and that a preset time period $t_s$ has elapsed from the temperature-increase mode operation start time, the refresh mode operation is started.

In the refresh mode operation, the throttle valve 160 is driven in Step S534 to keep the temperature of the NOx catalyst 13a at the predetermined temperature $T_1$. It is preferable that the opening of the throttle valve 160 be set at a value higher than a predetermined opening in the temperature-increase mode operation, and the amount of heat transmitted from the exhaust gas to the NOx catalyst 13a be not more than the minimum amount necessary to keep the catalyst temperature $T_{CAT}$ at the predetermined temperature $T_1$.

In Step S536, the fuel injection nozzle 148 is driven so that fuel is forcedly mixed in the exhaust gas from the nozzle 148. Whereby, like the fifth embodiment, the purifying capability reducing substances burnt and removed from the NOx catalyst 13a reacts with HC, so that the purifying capability reducing substances are removed reliably. Thus, the NOx purifying ability of the NOx catalyst 13a can be restored without deteriorating the operating condition of the engine 1.

The engine control apparatuses of the above third to sixth embodiments can be modified variously.

For example, although the amount of adhering purifying capability reducing substances is estimated on the basis of the travel distance D in the third to sixth embodiments, the adherence amount may be estimated on the basis of the fuel consumption accumulated amount, the intake air accumulated amount, the running time of the engine 1, or the like as described in the first and second embodiments and the modifications thereof.

Also, in the third to sixth embodiments, only when all of the judgment results in the operating condition determining step S216, the catalyst temperature determining step S230, and the elapsed time determining step S232 are Yes, the count value $C_{ST}$ representing the accumulated time is increased in increments. Alternatively, like the second embodiment, the count value $C_{ST}$ may be increased in increments when only the judgment results in Steps S216 and S230 are Yes, or when only the judgment results in Steps S216 and S232 are Yes, or when only the judgment result in Step S216 is Yes.

Also, in the third to sixth embodiments, the fixed predetermined value is used as a criterion for judging the amount of adhering purifying capability reducing substances. Alternatively, like the second embodiment, the predetermined value, which is a criterion, may be variable so that the predetermined value takes a smaller value gradually as the application time of the NOx catalyst 13a increases.

Although the case where the control apparatus is applied to a six-cylinder V-type engine is described in the third to sixth embodiments, the engine control apparatus of these embodiments can be applied to an engine of any type.

Further, a greater effect can be expected by installing a heat insulating material having high heat insulating properties around the exhaust manifolds 11a and 11b.

Next, an engine control apparatus in accordance with a seventh embodiment of the present invention will be described.

The apparatus of this embodiment is common to the apparatuses of the first to sixth embodiments in that when the estimated amount of purifying capability reducing substances adhering to the NOx catalytic device reaches an allowable limit, the catalytic device is heated to remove the purifying capability reducing substances from the catalytic device, but the apparatus differs from the apparatuses of the first to sixth embodiments in that the length of exhaust passage is decreased in the temperature-increase mode operation to heat the catalytic device.

The engine control apparatus of this embodiment is basically configured in the same manner as the apparatus shown in FIG. 1, and can be applied to an engine having the same configuration as that of the engine 1 shown in FIG. 1. Therefore, the explanation of the configuration of the engine control apparatus and the engine is omitted.

On the other hand, regarding the above difference, the apparatus of this embodiment differs from the apparatus shown in FIG. 1 as to the configuration of the exhaust pipe, the NOx catalyst, and the peripheral elements. The configuration of the exhaust pipe and its peripheral elements will be described below.

Figure 20:
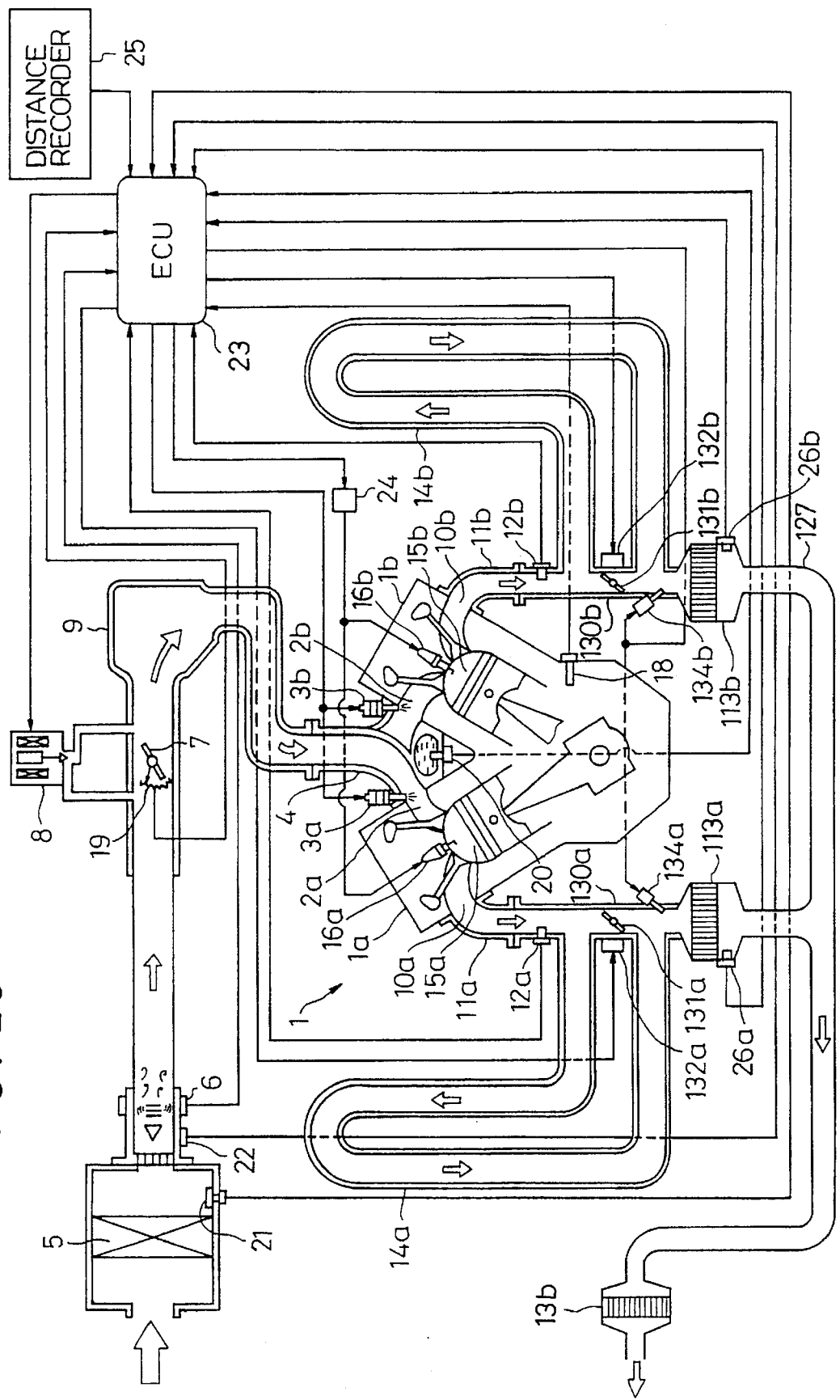
FIG. 20 is a schematic view showing an engine control apparatus according to a seventh embodiment of the present invention, showing together with peripheral elements.

As shown in FIG. 20, the apparatus of this embodiment has exhaust pipes (first exhaust passages) 14a and 14b, bypass pipes (second exhaust passages) 130a and 130b, and an exhaust pipe 127 in place of the exhaust pipe in FIG. 1.

The upstream ends of the exhaust pipes 14a and 14b are connected to the exhaust ports 10a and 10b of the engine 1 via the exhaust manifolds 11a and 11b, respectively. The bypass pipe 130a, 130b is installed in parallel with the exhaust pipe 14a, 14b, and the pipe length thereof is shorter than that of the exhaust pipe 14a, 14b. The bypass pipe 130a, 130b branches off from the exhaust pipe 14a, 14b in the vicinity of the outlet of the exhaust manifold 11a, 11b, and joins to the exhaust pipe 14a, 14b just before an NOx catalyst 113a, 113b.

On the downstream side of the exhaust pipes and 14b and the bypass pipes 130a and 130b, the NOx catalysts 113a and 113b, corresponding to the NOx catalyst 13a in FIG. 1, are disposed, respectively, and the exhaust pipe 27 is provided with a three-way catalyst 13b. Reference numerals 12a and 12b denote air-fuel ratio sensors installed on the exhaust pipes 14a and 14b, respectively.

In the vicinity of the inlets of the bypass pipes 130a and 130b, selector valves (valve means) 131a and 131b are provided to permit or inhibit the inflow of exhaust gas into the bypass pipes 130a and 130b, respectively. Reference numerals 132a and 132b denote valve driving devices for operating the selector valves 131a and 131b under the control of the ECU 23, respectively. Also, reference numerals 26a and 26b denote catalyst temperature sensors corresponding to the catalyst temperature sensor 26 in FIG. 1.

In the normal operation of the engine 1, the selector valves 131a and 131b are closed, so that the inflow of exhaust gas from the engine 1 to the bypass pipes 130a and 130b is inhibited, the exhaust gas passing through the exhaust pipes 14a and 14b. When the selector valves 131a and 131b are opened by the valve driving devices 132a and 132b, most of the exhaust gas flows into the NOx catalysts 113a and 113b via the bypass pipes 130a and 130b. Thereupon, high-temperature exhaust gas which has just discharged from the exhaust ports 10a and 10b is supplied to the NOx catalysts 113a and 113b, so that the NOx catalysts 113a and 113b are heated by the high-temperature exhaust gas. The NOx catalysts 113a and 113b are disposed near the engine 1, so that they are also heated by the heat dissipated from the engine 1.

On the upstream side of the NOx catalysts 113a and 113b, fuel injection nozzles (fuel supplying means) 134a and 134b are provided which open in accordance with the pulse current signal from the ECU 23 to inject fuel (gasoline etc.) toward the NOx catalysts 113a and 113b, respectively.

Next, an engine control apparatus in accordance with a seventh embodiment will be described.

Figure 21:
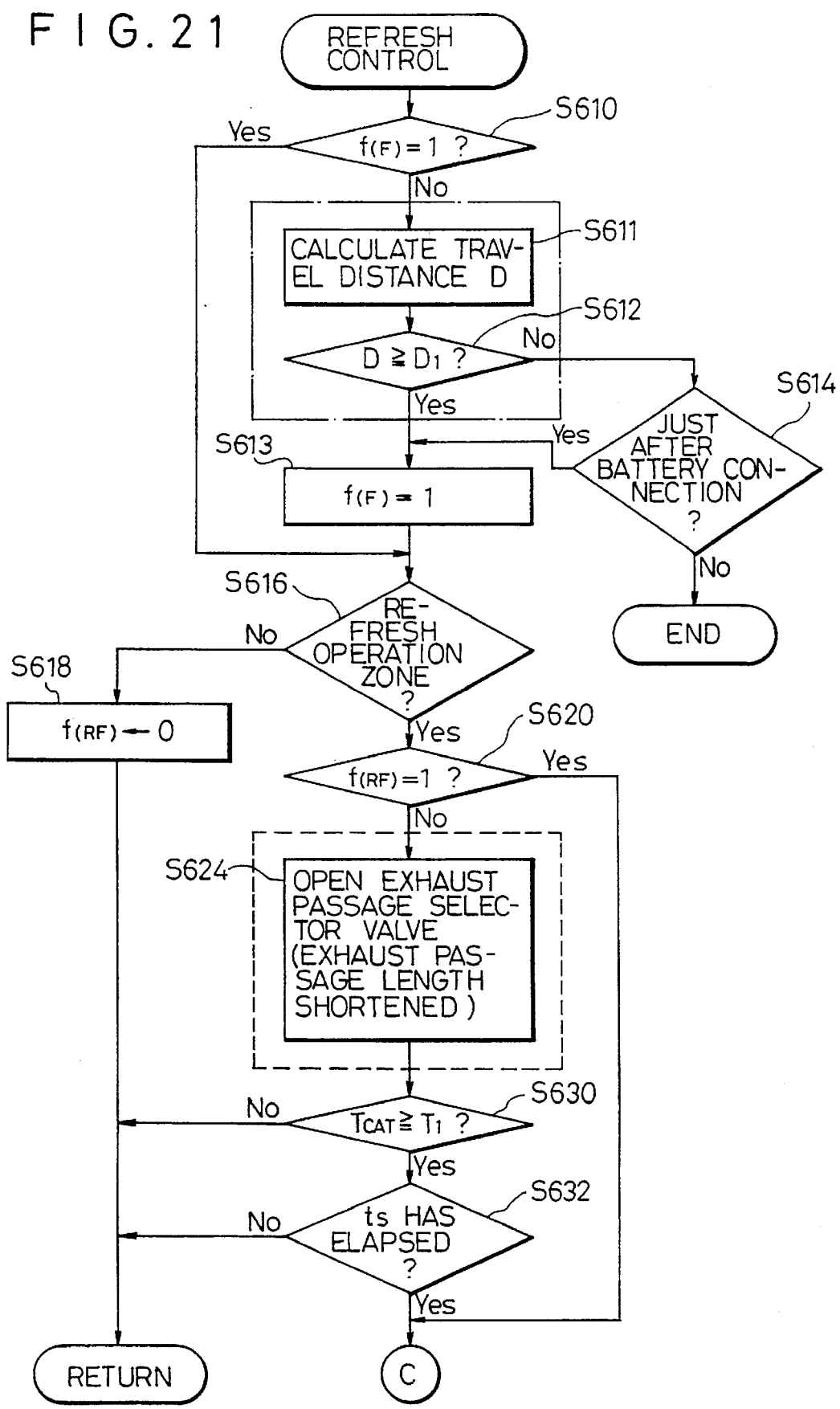
FIG. 21 is a flowchart showing part of a refresh control routine executed by the electronic control unit shown in FIG. 20.
Figure 22:
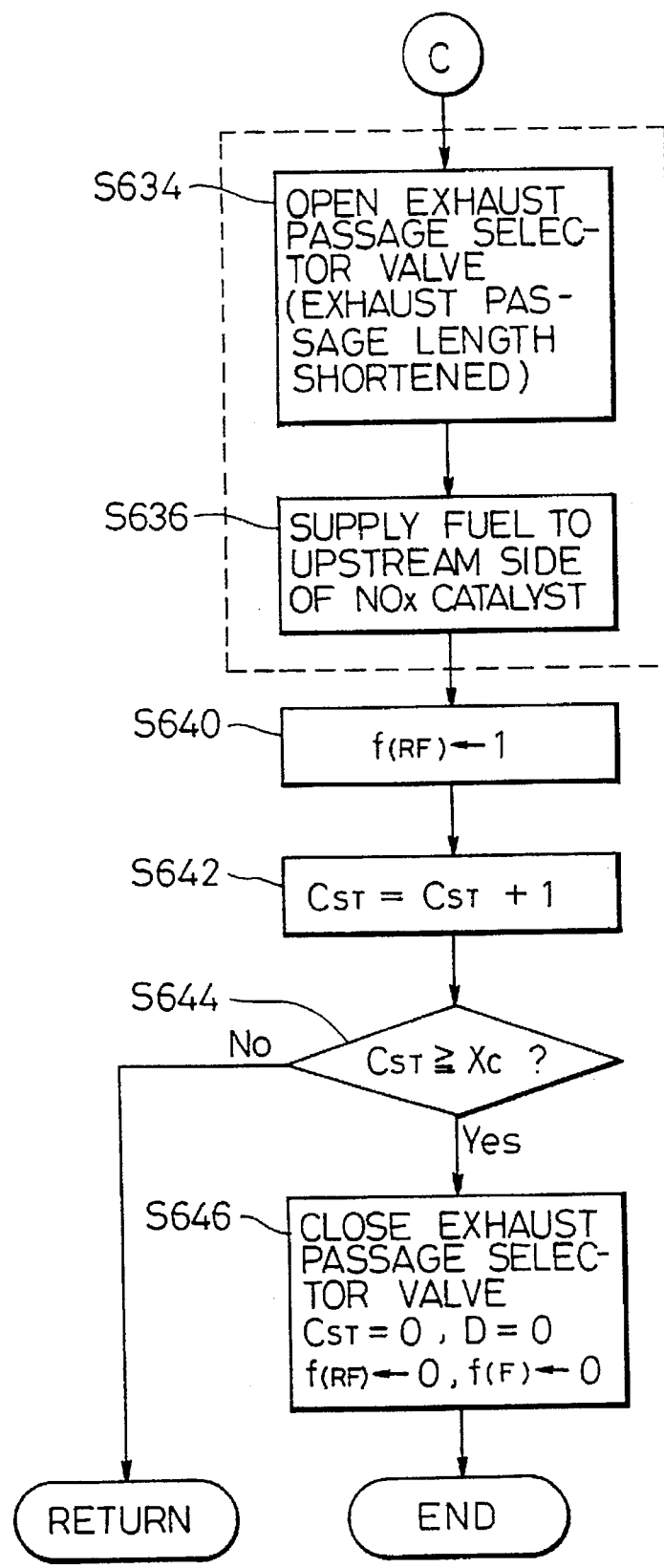
FIG. 22 is a flowchart of the remaining part of the refresh control routine following FIG. 20.

When the engine 1 is started, the refresh control routine shown in FIGS. 21 and 22 is executed by the ECU 23. This control routine is similar to that shown in FIG. 2 or that shown in FIGS. 7 and 8; therefore, the description of the steps common to these control routines is partially omitted.

Just after the engine start, it is judged in Step S610, corresponding to Step S10 in FIG. 2, that the value of flag f(F) is not "1", so that Steps S611 and S612, corresponding to Steps S11 and S12 in FIG. 2, are executed in sequence, by which the amount of purifying capability reducing substances adhering to the NOx catalysts 13a and 13b is estimated.

If the judgment result in Step S612 is Yes, that is, if it is judged that the travel distance D is not less than the predetermined value $D_1$, and hence the amount of adhering purifying capability reducing substances has reached the predetermined amount (allowable limit), the control flow proceeds to Step S616, corresponding to Step S16 in FIG. 2, through Step S613, corresponding to Step S13 in FIG. 2. If the judgment result in Step S612 is No, that is, if the travel distance D does not reach the predetermined value $D_1$, the control flow proceeds to Step S614, corresponding to Step S14 in FIG. 2. If the judgment result in Step S614 is No, that is, if it is judged that the battery has not just been reconnected, the refresh control routine ends. If the judgment result in Step S614 is Yes, that is, if it is judged that the battery has just been reconnected, the control flow proceeds to Step S616 through Step S613.

In Step S616, like Step S16 in FIG. 2, it is determined whether three conditions for refresh operation, represented by equations (1), (2), and (3), are met at the same time.

If the judgment result in Step S616 is No, in Step S618, corresponding to Step S118 in FIG. 7, the flag f(RF) is reset to "0" indicating that the refresh operation is not being executed, and the control flow returns to Step S610. If the judgment result in Step S616 is Yes, that is, if all of the three conditions for refresh operation are met, the control flow proceeds to Step S620, corresponding to Step S120 in FIG. 7, to start the refresh operation (here, the temperature-increase mode operation). At the same time, the counting of the elapsed time from the refresh operation start time is started by means of the timer counter in the ECU 23.

In Step S620, it is determined whether the value of flag f(RF) is "1". Just after the conditions for refresh operation have been met, the value of flag f(RF) remains being reset to "0", so that the judgment result in Step S620 is No, the control flow proceeding to Step S624.

In Step S624, the ECU 23 supplies a drive signal to the valve driving devices 132a and 132b to fully open the selector valves 131a and 131b, so as to increase the temperatures of the NOx catalysts 113a and 113b to the predetermined temperature $T_1$ (for example, 650° C.) high enough to burn and remove the purifying capability reducing substances from the NOx catalysts 113a and 113b.

As a result, most of the high-temperature exhaust gas which has just been discharged from the exhaust ports 10a and 10b flows into the NOx catalysts 113a and 113b in a short time via the bypass pipes 130a and 130b, respectively. Therefore, the exhaust gas passing through the NOx catalyst 113a, 113b has a higher temperature than the exhaust gas passing through the exhaust pipe 14a, 14b having a longer distance in the normal operation. The NOx catalysts 113a and 113b are heated to a high temperature by this high-temperature exhaust gas, so that the temperature $T_{CAT}$ of the NOx catalysts 113a and 113b reaches the predetermined temperature $T_1$ high enough to burn and remove the purifying capability reducing substances.

In Step S630 (corresponding to Step S130 in FIG. 7), it is determined whether the catalyst temperature $T_{CAT}$ has reached the predetermined temperature $T_1$. If this judgment result is No, the control flow returns to Step S610. If it is judged in Step S630 that the catalyst temperature $T_{CAT}$ has reached the predetermined temperature $T_1$, the control flow proceeds to Step S632, corresponding to Step S132 in FIG. 7, where it is determined whether a preset time period $t_s$ has elapsed from the temperature-increase mode operation start time. If this judgment result is No, the control flow returns to Step S610. If it is judged in Step S632 that the preset time period $t_s$ has elapsed, the refresh mode operation is started to keep the temperature of the NOx catalyst 113a, 113b at the predetermined temperature $T_1$, to thereby burn and remove the purifying capability reducing substances from the NOx catalyst 113a, 113b substantially perfectly.

In this refresh mode, first, in Step S634, like Step S624, a drive signal is supplied from the ECU 23 to the valve driving devices 132a and 132b to hold the selector valves 131a and 131b in the open condition, respectively. As a result, the exhaust gas flows into the NOx catalysts 113a and 113b via the bypass pipes 130a and 130b, respectively, by which the NOx catalyst temperature $T_{CAT}$ is kept at the predetermined temperature $T_1$, and the purifying capability reducing substances reacts with HC, so that the purifying capability reducing substances are burnt and removed satisfactorily.

At this time, if the operation amount of the valve driving device 132a, 132b is changed by changing the pulse width of the drive signal from the ECU 23, the amount of the exhaust gas passing through the bypass pipe 130a, 130b can be controlled by changing the valve opening of the selector valve 131a, 131b. Specifically, when the exhaust gas temperature is much higher than the predetermined temperature $T_1$, the amount of the exhaust gas passing through the bypass pipe 130a, 130b can be decreased by reducing the valve opening of the selector valve 131a, 131b, so that the NOx catalyst temperature $T_{CAT}$ can be kept properly at the predetermined temperature $T_1$.

In Step S636, the fuel injection nozzles 134a and 134b are driven by the ECU 23, so that fuel of a predetermined amount is injected from both nozzles and introduced forcedly into the exhaust gas. Whereby, the exhaust gas contains much HC, and therefore the purifying capability reducing substances react with this HC at a high temperature, so that the purifying capability reducing substances are removed reliably without adhering to the NOx catalysts 113a and 113b again. Also, this HC deoxidizes NOx, so that NOx adsorbed by the NOx catalysts. 113a and 113b is removed at the same time.

Next, Steps S640, S642, and S644, corresponding to Steps S140, S142, and S144 in FIG. 8, are executed in sequence. In Step S640, a flag f(RF) is set at "1" indicating that the refresh mode operation is being performed. In Step S642, a count value $C_{ST}$ representing the accumulated time from the refresh mode operation start time is updated. In Step S644, it is determined whether the count value $C_{ST}$ has reached a predetermined value $X_C$ corresponding to the predetermined time.

If it is judged in Step S644 that the count value $C_{ST}$ has not reached the predetermined value $X_C$, the control flow returns to Step S610. If it is again judged in Step S616 that the conditions for refresh operation are met, the control flow proceeds to Step S620. Since the flag f(RF) has already been set at "1" indicating that the refresh mode operation is being performed, the judgment result in Step S620 is Yes, so that the control flow proceeds to Step S634, the refresh mode operation being performed.

If the conditions for refresh operation are not met though the refresh mode operation has once been started, and the judgment result in Step S616 is No, the control flow proceeds to Step S618, where the value of flag f(RF) is reset to zero, and then the control flow returns to Step S610.

If the value of flag f(RF) is thus reset to zero once, the judgment result in Step S620 is No even if it is again judged in Step S616 that the conditions for refresh operation are met. Therefore, the temperature-increase mode operation is executed again in Step S624.

If it is judged in Step S644 that the count value $C_{ST}$ has reached the predetermined value $X_C$, the control flow proceeds to Step S646, corresponding to Step S146 in FIG. 8, where the count value $C_{ST}$, the travel distance D, the flag f(F), and the flag f(RF) are reset to zero, ready for the next execution of refresh operation. At the same time, the selector valves 131a and 131b are closed and the fuel injection nozzles 134a and 134b are inactivated. Thus, the refresh control routine in FIGS. 21 and 22 ends.

The above-described seventh embodiment can be modified variously.

For example, in the seventh embodiment, when it is judged that both of the catalyst temperature $T_{CAT}$ detected by the catalyst temperature sensor 26a and the catalyst temperature $T_{CAT}$ detected by the catalyst temperature sensor 26b reach the predetermined temperature $T_1$ in Step S630 in the refresh control routine, the refresh mode operations for both NOx catalysts 113a and 113b are executed at the same time. Alternatively, the refresh mode operation for the NOx catalyst 113a and the refresh mode operation for NOx catalyst 113b may be executed independently. In this case, the judgment as to the catalyst temperature is made individually on the basis of the detection signal from the catalyst temperature sensor 26a or the catalyst temperature sensor 26b, and the refresh mode operation is performed for each of the NOx catalysts 113a and 113b in accordance with this judgment result.

Also, in the seventh embodiment, fuel is injected forcedly from the fuel injection nozzles 134a and 134b to supply HC to the NOx catalysts 113a and 113b during the refresh mode operation. However, the supply method of HC is not limited to this. For example, the same effect can be achieved by making the air-fuel ratio of mixture supplied to the engine 1 rich so that the exhaust gas contains unburnt HC.

Although the amount of adhering purifying capability reducing substances is estimated on the basis of the travel distance D in the seventh embodiment, the adherence amount may be estimated on the basis of the fuel consumption accumulated amount, the intake air accumulated amount, the running time of the engine 1, or the like as described in the first to sixth embodiments and the modifications thereof.

In the seventh embodiment, only when all judgment results in the operating condition determining step S616, the catalyst temperature determining step S630, and the elapsed time determining step S632 are Yes, the count value $C_{ST}$ representing the accumulated time is increased in increments. Alternatively, like the second to sixth embodiments, the count value $C_{ST}$ may be increased in increments when only the judgment results in Steps 616 and S630 are Yes, or when only the judgment results in Steps S616 and S632 are Yes, or when only the judgment result in step S616 is Yes.

Further, in the seventh embodiment, the fixed predetermined value is used as a criterion for judging the amount of adhering purifying capability reducing substances. Alternatively, like the second embodiment, the predetermined value, which is a criterion, may be variable so that the predetermined value takes a smaller value gradually as the application time of the NOx catalysts 113a and 113b increases.

Although the case where the control apparatus is applied to a six-cylinder V-type engine is described in the seventh embodiment, the engine control apparatus of this embodiment can be applied to an engine of any type, like the first to sixth embodiments.

Also, a greater effect can be expected by installing a heat insulating material having high heat insulating properties around the exhaust manifolds 11a and 11b, like the modifications of the third to sixth embodiments.

Further, the engine control apparatus of the present invention is not limited to the first to seventh embodiments and the modifications thereof, but can be changed variously. For example, the estimation of the amount of adhering purifying capability reducing substances, the temperature-increase mode operation, and the refresh mode operation in the first to seventh embodiments and the modifications thereof can be combined in various manners.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A control apparatus for an internal combustion engine having an exhaust purifying catalytic device disposed in an exhaust passage for reducing emission of nitrogen oxides to atmosphere, the exhaust purifying catalytic device being operable to adsorb nitrogen oxides contained in exhaust gas discharged from the internal combustion engine when the engine is in a lean-combustion mode where an air-fuel ratio of an air-fuel mixture supplied to the engine is leaner than a theoretical air-fuel ratio, and to deoxidize adsorbed nitrogen oxides when the internal combustion engine is in a rich-combustion mode where the air-fuel ratio is equal to or richer than the theoretical air-fuel ratio, comprising:

adsorption amount estimating means for estimating an adsorption amount of purifying capability reducing substances, which decreases nitrogen oxide adsorbing ability of the exhaust purifying catalytic device, adsorbed by the exhaust purifying catalytic device and for determining whether the estimated adsorption amount has reached a predetermined adsorption amount; and catalyst heating means for removing the purifying capability reducing substances from the exhaust purifying catalytic device by increasing a temperature of the exhaust purifying catalytic device by changing an operating condition of the internal combustion engine so that an exhaust gas temperature increases when said adsorption amount estimating means judges that the estimated adsorption amount has reached the predetermined adsorption amount.

2. A control apparatus according to claim 1, wherein said adsorption amount estimating means includes fuel amount accumulating means for accumulating fuel consumption of the internal combustion engine, and judges that the estimated adsorption amount has reached the predetermined adsorption amount when the accumulated fuel consumption calculated by said fuel amount accumulating means reaches a predetermined amount.

3. A control apparatus according to claim 2, wherein the internal combustion engine is supplied with fuel from a fuel injection valve driven by a pulse-shaped driving current, said fuel amount accumulating means accumulates a pulse width of the driving current, and said accumulated fuel consumption is calculated on the basis of the accumulated pulse width.

4. A control apparatus according to claim 2, wherein said fuel amount accumulating means accumulates the fuel consumption only when the internal combustion engine is being operated in the lean-combustion mode.

5. A control apparatus according to claim 2, further including:

catalyst temperature detecting means for detecting the temperature of the exhaust purifying catalytic device;

wherein said fuel amount accumulating means accumulates the fuel consumption only when the catalytic device temperature is not higher than a predetermined temperature.

6. A control apparatus according to claim 1, wherein said adsorption amount estimating means includes travel distance accumulating means for accumulating a travel distance of a vehicle on which the internal combustion engine is mounted, and judges that the estimated adsorption amount has reached the predetermined adsorption amount when the accumulated vehicle travel distance reaches a predetermined value.

7. A control apparatus according to claim 1, wherein said adsorption amount estimating means includes intake air amount accumulating means for detecting and accumulating an intake air amount of the internal combustion engine, and judges that the estimated adsorption amount has reached the predetermined adsorption amount when the accumulated intake air amount reaches a predetermined value.

8. A control apparatus according to claim 1, wherein said catalyst heating means burns fuel near the exhaust purifying catalytic device by changing the operating condition of the internal combustion engine so that fuel and air are supplied into the exhaust gas, by which the exhaust purifying catalytic device is heated by increasing the exhaust gas temperature.

9. A control apparatus according to claim 8, wherein said catalyst heating means includes air-fuel ratio control means for controlling the air-fuel ratio of the air-fuel mixture supplied to the internal combustion engine, and said air-fuel ratio control means controls the air-fuel ratio in part of cylinders of the internal combustion engine to a value lower than the theoretical air-fuel ratio to perform rich-combustion operation in said part of cylinders and controls the air-fuel ratio in the remaining cylinders to a value higher than the theoretical air-fuel ratio to perform lean-combustion operation in said remaining cylinders, by which the fuel and air are supplied into the exhaust gas.

10. A control apparatus according to claim 9, wherein said air-fuel ratio control means makes an average air-fuel ratio of all the cylinders of the internal combustion engine substantially equal to the theoretical air-fuel ratio when the exhaust purifying catalytic device is heated.

11. A control apparatus according to claim 9, wherein said air-fuel ratio control means includes catalyst temperature detecting means for detecting a temperature of the exhaust purifying catalytic device, and controls the air-fuel ratio so that the catalytic device temperature is kept at a predetermined temperature after the detected catalytic device temperature has increased to the predetermined temperature.

12. A control apparatus according to claim 11, wherein said air-fuel ratio control means makes an average air-fuel ratio of all the cylinders of the internal combustion engine substantially equal to the theoretical air-fuel ratio before the detected catalytic device temperature reaches said predetermined temperature, and corrects the average air-fuel ratio to a side richer than the theoretical air-fuel ratio after the predetermined temperature has been reached.

13. A control apparatus according to claim 9, wherein the internal combustion engine is a V-type engine, and said part of cylinders are on one bank side of said V-type engine, and said remaining cylinders are on the other bank side.

14. A control apparatus according to claim 9, wherein said air-fuel ratio control means includes ignition timing control means for controlling ignition timing of the internal combustion engine, and said ignition timing control means retards the ignition timing of said part of cylinders in which the rich-combustion operation is performed and advances the ignition timing of said remaining cylinders in which the lean-combustion operation is performed.

15. A control apparatus according to claim 9, wherein said air-fuel ratio control means includes intake air amount regulating means, and said intake air amount regulating means increases an intake air amount of the internal combustion engine when the rich-combustion operation is performed in said part of cylinders of the internal combustion engine and the lean-combustion operation is performed in the remaining cylinders.

16. A control apparatus according to claim 1, further including:

a lockup clutch interposed between the internal combustion engine and an automatic transmission; and clutch control means for changing over said lockup clutch between a connected state in which the engine is connected directly to the automatic transmission and a disconnected state in which the engine is not connected directly to the automatic transmission;

wherein said clutch control means makes said lockup clutch disconnected during the time when the temperature of the exhaust purifying catalytic device is raised by said catalyst heating means.

17. A control apparatus according to claim 1, further including:

operating condition detecting means for detecting an operating condition of the internal combustion engine;

wherein said catalyst heating means heats the exhaust purifying catalytic device when said operating condition detecting means judges that the internal combustion engine is in a predetermined medium or heavy load operating condition.

18. A control apparatus according to claim 17, wherein said operating condition detecting means includes exhaust temperature estimating means for estimating an exhaust temperature of the internal combustion engine, and said operating condition detecting means judges that the internal combustion engine is in said predetermined medium or heavy load operating condition when the estimated exhaust temperature is not lower than a predetermined temperature.

19. A control apparatus according to claim 18, wherein said exhaust temperature estimating means includes load detecting means for detecting a load of the internal combustion engine and rotational speed detecting means for detecting a rotational speed of the internal combustion engine, and said exhaust temperature estimating means estimates said exhaust temperature on the basis of the detected engine load and the detected engine rotational speed.

20. A control apparatus according to claim 17, further including:

time measuring means for accumulatively measuring a time period elapsed during the time when said operating condition detecting means judges that the internal combustion engine is in said predetermined medium or heavy load operating condition, and said catalyst heating means heats the exhaust purifying catalytic device until the counted elapsed time period reaches a predetermined time.

21. A control apparatus according to claim 20, further including:

catalyst temperature detecting means for detecting the temperature of the exhaust purifying catalytic device;

wherein said time measuring means accumulatively measures said elapsed time period when the detected catalyst device temperature is not lower than a predetermined temperature.

22. A control apparatus according to claim 20, wherein said time measuring means starts to accumulatively measure said elapsed time period from a moment when a predetermined delay time has elapsed after said operating condition detecting means judges that the internal combustion engine is in said predetermined medium or heavy load operating condition.

23. A control apparatus according to claim 1, wherein said adsorption amount estimating means includes storage means for storing the estimated adsorption amount of the purifying capability reducing substances as long as said storage means is connected to a power source and power is supplied from said power source, and said catalyst heating means heats the exhaust purifying catalytic device independently of the estimated adsorption amount when the supply of power from said power source to said storage means is restarted after the power is not supplied from said power source to said storage means.

24. A control apparatus according to claim 1, wherein said catalyst heating means increases the exhaust gas temperature by changing a burning state of the internal combustion engine.

25. A control apparatus according to claim 24, wherein said catalyst heating means includes ignition timing correcting means for correcting ignition timing of the internal combustion engine, and said ignition timing correcting means changes the burning state of the internal combustion engine by retarding the ignition timing of the internal combustion engine.

26. A control apparatus according to claim 25, wherein said catalyst heating means includes intake air amount correcting means for correcting an intake air amount of the internal combustion engine, and said intake air amount correcting means increases the intake air amount during the time when said ignition timing correcting means retards the ignition timing.

27. A control apparatus according to claim 25, further including:
rotational speed detecting means for detecting a rotational speed of the internal combustion engine; and
volumetric efficiency detecting means for detecting a volumetric efficiency of the internal combustion engine;
wherein said ignition timing correcting means sets a retard amount of the ignition timing on the basis of the detected engine rotational speed and the detected volumetric efficiency.

28. A control apparatus according to claim 1, wherein said catalyst heating means includes catalyst temperature detecting means for detecting the temperature of the exhaust purifying catalytic device and air-fuel ratio control means for controlling the internal combustion engine so that the internal combustion engine is operated in a rich-combustion mode in which the air-fuel ratio of the air-fuel mixture supplied to the internal combustion engine is equal to or richer than the theoretical air-fuel ratio, when the detected catalytic device temperature reaches a predetermined temperature.

29. A control apparatus according to claim 1, wherein said catalyst heating means includes air-fuel control means for controlling the internal combustion engine so that the internal combustion engine is operated in a rich-combustion mode in which the air-fuel ratio of the air-fuel mixture supplied to the internal combustion engine is equal to or richer than the theoretical air-fuel ratio, when said adsorption amount estimating means judges that the adsorption amount of the purifying capability reducing substances has reached the predetermined adsorption amount; and secondary air supplying means for supplying secondary air to an upstream side with respect to the exhaust purifying catalytic device in the exhaust passage when the internal combustion engine is controlled so that the internal combustion engine is operated in the rich-combustion mode.

30. A control apparatus according to claim 29, wherein said catalyst heating means includes catalyst temperature detecting means for detecting the temperature of the exhaust purifying catalytic device, and said secondary air supplying means decreases a supply amount of the secondary air when the detected catalytic device temperature reaches a predetermined temperature.

31. A control apparatus according to claim 29, further including:
rotational speed detecting means for detecting a rotational speed of the internal combustion engine; and
volumetric efficiency detecting means for detecting a volumetric efficiency of the internal combustion engine;
wherein said air-fuel ratio control means sets the air-fuel ratio during the time the internal combustion engine is operated in the rich-combustion mode on the basis of the detected engine rotational speed and the detected volumetric efficiency.

32. A control apparatus according to claim 29, further including:
rotational speed detecting means for detecting rotational speed of the internal combustion engine; and
volumetric efficiency detecting means for detecting a volumetric efficiency of the internal combustion engine;
wherein said secondary air supplying means sets a supply amount of the secondary air on the basis of the detected engine rotational speed and the detected volumetric efficiency.

33. A control apparatus according to claim 1, wherein said catalyst heating means increases the exhaust gas temperature by changing a flow velocity of the exhaust gas.

34. A control apparatus according to claim wherein said catalyst heating means includes an exhaust throttle valve, installed on a downstream side with respect to the exhaust purifying catalytic device in the exhaust passage, for changing an area of the exhaust passage, and said catalyst heating means changes the flow velocity of the exhaust gas by controlling said exhaust throttle valve so that the exhaust passage area is decreased.

35. A control apparatus according to claim 33, wherein said catalyst heating means includes catalyst temperature detecting means for detecting the temperature of the exhaust purifying catalytic device and fuel supplying means for supplying fuel to an upstream side with respect to the exhaust purifying catalytic device in the exhaust passage when the detected catalyst temperature reaches a predetermined temperature.

36. A control apparatus according to claim 1, further including:
exhaust pipe length changing means for changing an exhaust passage length from an exhaust port of the internal combustion engine to the exhaust purifying catalytic device so that said exhaust pipe length changing means is controlled in such a manner that, when said adsorption amount estimating means judges that the adsorption amount of the purifying capability reducing substances has reached the predetermined adsorption amount, the exhaust passage length is shorter than that before it is judged that the estimated adsorption amount has reached the predetermined adsorption amount, by which the temperature of exhaust gas supplied to the exhaust purifying catalytic device is increased.

37. A control apparatus according to claim 36, wherein said exhaust pipe length changing means includes a first exhaust passage forming at least part of the exhaust passage extending from the exhaust port of the internal combustion engine to the exhaust purifying catalytic device, a second exhaust passage disposed in parallel with said first exhaust passage and shorter than said first exhaust passage, and valve means for opening and closing said second exhaust passage;

wherein said exhaust heating means closes said second exhaust passage by using said valve means before said adsorption amount estimating means judges that the estimated adsorption amount has reached the predetermined adsorption amount, and drives said valve means to open said second exhaust passage when said adsorption amount estimating means judges that the estimated adsorption amount has reached the predetermined adsorption amount, by which the exhaust gas is supplied to the exhaust purifying catalytic device via said second exhaust passage.

38. A control apparatus according to claim 36, wherein the exhaust purifying catalytic device is disposed near a body of the internal combustion engine.

39. A control apparatus according to claim 36, wherein said catalyst heating means includes catalyst temperature detecting means for detecting the temperature of the exhaust purifying catalytic device, and fuel supplying means for supplying fuel to an upstream side with respect to the exhaust purifying catalytic device in the exhaust passage when the detected catalyst temperature reaches a predetermined temperature.

40. A control apparatus for an internal combustion engine having an exhaust purifying catalytic device disposed in an exhaust passage for reducing emission of nitrogen oxides to atmosphere, the exhaust purifying catalytic device being operable to adsorb nitrogen oxides contained in exhaust gas discharged from the internal combustion engine when the engine is in a lean-combustion mode where an air-fuel ratio of an air-fuel mixture supplied to the engine is leaner than a theoretical air-fuel ratio, and to deoxidize adsorbed nitrogen oxides when the internal combustion engine is in a rich-combustion mode where the air-fuel ratio is equal to or richer than the theoretical air-fuel ratio, comprising:

a burner, disposed near the exhaust purifying catalytic device, for heating the exhaust purifying catalytic device;

adsorption amount estimating means for estimating an adsorption amount of purifying capability reducing substances, which decreases nitrogen oxide adsorbing ability of the exhaust purifying catalytic device, adsorbed by the exhaust purifying catalytic device, and for determining whether the estimated adsorption amount has reached a predetermined adsorption amount; and catalyst heating means for removing the purifying capability reducing substances from the exhaust purifying catalytic device by activating said burner when said adsorption amount estimating means judges that the adsorption amount of the purifying capability reducing substances has reached the predetermined adsorption amount.

41. An internal combustion engine control method for reducing emission of nitrogen oxides to atmosphere, by causing nitrogen oxides, contained in exhaust gas discharged from the internal combustion engine, to be adsorbed by an exhaust purifying catalytic device, disposed in an exhaust passage of the internal combustion engine, when the engine is in a lean-combustion mode where an air-fuel ratio of an air-fuel mixture supplied to the engine is leaner than a theoretical air-fuel ratio, and by deoxidizing adsorbed nitrogen oxides by means of the exhaust purifying catalytic device when the internal combustion engine is in a rich-combustion mode where the air-fuel ratio is equal to or richer than the theoretical air-fuel ratio, comprising the steps of:

(a) estimating an adsorption amount of purifying capability reducing substances, which decreases nitrogen oxide adsorbing ability of the exhaust purifying catalytic device, adsorbed by the exhaust purifying catalytic device, and determining whether the estimated adsorption amount has reached a predetermined adsorption amount; and (b) removing the purifying capability reducing substances from the exhaust purifying catalytic device by increasing a temperature of the exhaust purifying catalytic device by changing an operating condition of the internal combustion engine so that an exhaust gas temperature increases when it is judged in said step (a) that the estimated adsorption amount has reached the predetermined adsorption amount.

42. An internal combustion engine control method according to claim 41, wherein said step (a) includes the sub-steps of:

(a1) accumulating fuel consumption of the internal combustion engine; and (a2) judging that the estimated adsorption amount has reached the predetermined adsorption amount when the accumulated fuel consumption calculated in said sub-step (a1) reaches a predetermined value.

43. An internal combustion engine control method according to claim 42, wherein said sub-step (a1) includes accumulating a pulse width of a driving current supplied to a fuel injection valve installed on the internal combustion engine, and calculating said accumulated fuel consumption on the basis of the accumulated pulse width.

44. An internal combustion engine control method according to claim 42, wherein said sub-step (a1) includes accumulating the fuel consumption only when the internal combustion engine is operated in the lean-combustion mode.

45. An internal combustion engine control method according to claim 42, further including the sub-step of:

(a3) detecting the temperature of the exhaust purifying catalytic device;

wherein said sub-step (a1) includes accumulating the fuel consumption only when the catalytic device temperature detected in said sub-step (a3) is not higher than a predetermined temperature.

46. An internal combustion engine control method according to claim 41, wherein said step (a) includes the sub-steps of:

(a1) determining an accumulated value of a travel distance of a vehicle on which the internal combustion engine is mounted; and (a2) judging that the estimated adsorption amount has reached the predetermined adsorption amount when the accumulated value of the vehicle travel distance determined in said sub-step (a1) reaches a predetermined value.

47. An internal combustion engine control method according to claim 41, wherein said step (a) includes the sub-steps of:
(a1) determining an accumulated value of an intake air amount by detecting the intake air amount of the internal combustion engine; and
(a2) judging that the estimated adsorption amount has reached the predetermined adsorption amount when the accumulated value of the intake air amount determined in said sub-step (a1) reaches a predetermined value.

48. An internal combustion engine control method according to claim 41, wherein said step (b) includes burning fuel in the vicinity of the exhaust purifying catalytic device by changing the operating condition of the internal combustion engine so that fuel and air are supplied into the exhaust gas, by which the exhaust gas temperature is increased to heat the exhaust purifying catalytic device.

49. An internal combustion engine control method according to claim 48, wherein said step (b) includes controlling the air-fuel ratio in part of cylinders of the internal combustion engine to a value lower than the theoretical air-fuel ratio and controlling the air-fuel ratio in the remaining cylinders to a value higher than the theoretical air-fuel ratio, by which rich-combustion operation is performed in said part of cylinders and lean-combustion operation is performed in said remaining cylinders to supply the fuel and air into the exhaust gas.

50. An internal combustion engine control method according to claim 49, wherein said step (b) includes making an average air-fuel ratio of all the cylinders of the internal combustion engine substantially equal to the theoretical air-fuel ratio when the exhaust purifying catalytic device is heated.

51. An internal combustion engine control method according to claim 49, wherein said step (b) includes the sub-steps of:
(b1) detecting the temperature of the exhaust purifying catalytic device; and
(b2) controlling the air-fuel ratio so that the catalytic device temperature is kept at a predetermined temperature after the catalytic device temperature detected in said sub-step (b1) has increased to said predetermined temperature.

52. An internal combustion engine control method according to claim 51, wherein said sub-step (b2) includes making the average air-fuel ratio of all the cylinders of the internal combustion engine substantially equal to the theoretical air-fuel ratio before the catalytic device temperature detected in said sub-step (b1) and correcting the average air-fuel ratio to a side richer than the theoretical air-fuel ratio after the predetermined temperature has been reached.

53. An internal combustion engine control method according to claim 49, wherein said step (b) includes controlling the air-fuel ratio for cylinders on one bank side of a V-type engine to a value lower than the theoretical air-fuel ratio and controlling the air-fuel ratio for cylinders on the other bank side of said V-type engine to a value higher than the theoretical air-fuel ratio, by which the rich-combustion operation is performed in the cylinders on said one bank side and the lean-combustion operation is performed in the cylinders on said other band side.

54. An internal combustion engine control method according to claim 49, further including the step of:
(c) retarding ignition timing of said part of cylinders in which the rich-combustion operation is performed and advancing the ignition timing of said remaining cylinders in which the lean-combustion operation is performed.

55. An internal combustion engine control method according to claim 49, further including the step of:
(c) increasing an intake air amount of the internal combustion engine when the rich-combustion operation is performed in said part of cylinders of the internal combustion engine and the lean-combustion operation is performed in the remaining cylinders.

56. An internal combustion engine control method according to claim 41, further including the step of:
(c) disconnecting an automatic transmission from the internal combustion engine by means of a lockup clutch during the time when the temperature of the exhaust purifying catalytic device is raised in said step (b), the lockup clutch being operable to change over a connecting condition between the internal combustion engine and the automatic transmission between a connected state and a disconnected state.

57. An internal combustion engine control method according to claim 41, wherein said step (b) includes the sub-steps of:
(b1) detecting an operating condition of the internal combustion engine; and
(b2) heating the exhaust purifying catalytic device when it is judged that the internal combustion engine is in a predetermined medium or heavy load operating condition in said sub-step (b1).

58. An internal combustion engine control method according to claim 57, wherein said sub-step (b1) includes the sub-steps of:
(b11) estimating an exhaust temperature of the internal combustion engine; and
(b12) judging that the internal combustion engine is in said predetermined medium or heavy load operating condition when the estimated exhaust temperature is not lower than a predetermined temperature.

59. An internal combustion engine control method according to claim 58, wherein said sub-step (b11) includes the sub-steps of:
(b111) detecting a load of the internal combustion engine;
(b112) detecting a rotational speed of the internal combustion engine; and
(b113) estimating said exhaust temperature on the basis of the engine load detected in said sub-step (b111) and the engine rotational speed detected in said sub-step (b112).

60. An internal combustion engine control method according to claim 57, further including the sub-step of:
(b3) accumulatively measuring a time period elapsed during the time when it is judged that the internal combustion engine is in said predetermined medium or heavy load operating condition;
wherein said step (b2) includes heating the exhaust purifying catalytic device until the elapsed time period measured in said step (b3) reaches a predetermined time.

61. An internal combustion engine control method according to claim 60, further including the sub-step of:
(b4) detecting the temperature of the exhaust purifying catalytic device;
wherein said sub-step (b3) includes accumulatively measuring said elapsed time period when the catalytic device temperature detected in said sub-step (b4) is not lower than a predetermined temperature.

62. An internal combustion engine control method according to claim 60, wherein said sub-step (b3) includes starting to accumulatively measure the elapsed time period from a moment when a predetermined delay time has elapsed after it is judged that the internal combustion engine is in said predetermined medium or heavy load operating condition in said sub-step (b1).

63. An internal combustion engine control method according to claim 41, further including the steps of:
(c) storing the estimated adsorption amount of the purifying capability reducing substances;
(d) heating the exhaust purifying catalytic device independently of the estimated adsorption amount when the storage of estimated adsorption amount of the purifying capability reducing substances becomes possible again after the storage of estimated adsorption amount of the purifying capability reducing substances has become impossible in said step (c).

64. An internal combustion engine control method according to claim 41, wherein said step (b) includes increasing the exhaust gas temperature by changing a burning state of the internal combustion engine.

65. An internal combustion engine control method according to claim 64, wherein said step (b) includes changing the burning state of the internal combustion engine by retarding ignition timing of the internal combustion engine.

66. An internal combustion engine control method according to claim 65, further including the step of:
(c) increasing an intake air amount during the time when the ignition timing of the internal combustion engine is retarded in said step (b).

67. An internal combustion engine control method according to claim 65, further including the steps of:
(c) detecting a rotational speed of the internal combustion engine; and
(d) detecting a volumetric efficiency of the internal combustion engine;
wherein said step (b) includes setting a retard amount of the ignition timing on the basis of the engine rotational speed detected in said step (c) and the volumetric efficiency detected in said step (d).

68. An internal combustion engine control method according to claim 41, further including the steps of:
(c) detecting the temperature of the exhaust purifying catalytic device; and
(d) controlling the internal combustion engine so that the internal combustion engine is operated in a rich-combustion mode in which the air-fuel ratio of the air-fuel mixture supplied to the internal combustion engine is equal to or richer than the theoretical air-fuel ratio, when the catalytic device temperature detected in said step (c) reaches a predetermined temperature.

69. An internal combustion engine control method according to claim 41, wherein said step (b) includes the sub-steps of:
(b1) controlling the internal combustion engine so that the internal combustion engine is operated in a rich-combustion mode in which the air-fuel ratio of the air-fuel mixture supplied to the internal combustion engine is equal to or richer than the theoretical air-fuel ratio, when it is judged that the estimated adsorption amount has reached the predetermined adsorption amount in said step (a); and
(b2) supplying secondary air to an upstream side with respect to the exhaust purifying catalytic device in the exhaust passage when the internal combustion engine is controlled in said sub-step (b1) so that the internal combustion engine is operated in the rich-combustion mode.

70. An internal combustion engine control method according to claim 69, wherein said step (b) includes the sub-step of:
(b3) detecting the temperature of the exhaust purifying catalytic device;
wherein said sub-step (b2) includes decreasing a supply amount of the secondary air when the catalytic device temperature detected in said sub-step (b3) reaches a predetermined temperature.

71. An internal combustion engine control method according to claim 69, further including the steps of:
(c) detecting a rotational speed of the internal combustion engine; and
(d) detecting a volumetric efficiency of the internal combustion engine;
wherein said sub-step (b1) includes setting the air-fuel ratio during the time the internal combustion engine is operated in the rich-combustion mode on the basis of the engine rotational speed detected in said step (c) and the volumetric efficiency detected in said step (d).

72. An internal combustion engine control method according to claim 69, further including the steps of:
(c) detecting a rotational speed of the internal combustion engine; and
(d) detecting a volumetric efficiency of the internal combustion engine;
wherein said step (b2) includes setting a supply amount of the secondary air on the basis of the engine rotational speed detected in said step (c) and the volumetric efficiency detected in said step (d).

73. An internal combustion engine control method according to claim 41, wherein said step (b) includes increasing the exhaust gas temperature by changing a flow velocity of the exhaust gas discharged from the internal combustion engine.

74. An internal combustion engine control method according to claim 73, wherein said step (b) includes changing the flow velocity of the exhaust gas by decreasing a passage area on a downstream side with respect to the exhaust purifying catalytic device in the exhaust passage.

75. An internal combustion engine control method according to claim 73, further including the steps of:
(c) detecting the temperature of the exhaust purifying catalytic device; and
(d) supplying fuel to an upstream side with respect to the exhaust purifying catalytic device in the exhaust passage when the catalyst temperature detected in said step (c) reaches a predetermined temperature.

76. An internal combustion engine control method according to claim 41, wherein said step (b) includes making an exhaust passage length from an exhaust port of the internal combustion engine to the exhaust purifying catalytic device shorter than that before it is judged that the predetermined adsorption amount has been reached when it is judged that the estimated adsorption amount has reached the predetermined adsorption amount in said step (a), by which the temperature of the exhaust gas supplied to the exhaust purifying catalytic device is increased.

77. An internal combustion engine control method according to claim 76, further including the steps of:
(c) detecting the temperature of the exhaust purifying catalytic device; and
(d) supplying fuel to an upstream side with respect to the exhaust purifying catalytic device in the exhaust passage when the catalyst temperature detected in said step (c) reaches a predetermined temperature.

* * * * *